United States Patent
Fujii

(10) Patent No.: US 11,358,594 B2
(45) Date of Patent: Jun. 14, 2022

(54) LANE CHANGE ASSIST DEVICE

(71) Applicant: TOYOTA JIDOSHA KABUSHIKI KAISHA, Toyota (JP)

(72) Inventor: Shota Fujii, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 239 days.

(21) Appl. No.: 16/858,025

(22) Filed: Apr. 24, 2020

(65) Prior Publication Data

US 2020/0247400 A1 Aug. 6, 2020

Related U.S. Application Data

(63) Continuation of application No. 15/991,136, filed on May 29, 2018, now Pat. No. 10,676,084.

(30) Foreign Application Priority Data

Jun. 6, 2017 (JP) .............................. JP2017-111689

(51) Int. Cl.
*B60W 30/095* (2012.01)
*B60W 30/18* (2012.01)

(52) U.S. Cl.
CPC .... *B60W 30/0953* (2013.01); *B60W 30/0956* (2013.01); *B60W 30/18163* (2013.01); *B60W 2420/42* (2013.01); *B60W 2520/14* (2013.01)

(58) Field of Classification Search
None
See application file for complete search history.

(56) References Cited

U.S. PATENT DOCUMENTS

| | | |
|---|---|---|
| 7,391,304 B2 | 6/2008 | Kataoka et al. |
| 10,011,281 B1 | 7/2018 | Kang et al. |
| 10,074,279 B1 | 9/2018 | Xu et al. |
| 2005/0125125 A1 | 6/2005 | Matsumoto et al. |
| 2005/0240328 A1 | 10/2005 | Shirato et al. |
| 2005/0270145 A1 | 12/2005 | Kataoka et al. |
| 2006/0025918 A1 | 2/2006 | Saeki |
| 2010/0023218 A1 | 1/2010 | Hayakawa et al. |
| 2010/0042282 A1 | 2/2010 | Taguchi et al. |
| 2010/0318263 A1 | 12/2010 | Hayakawa et al. |
| 2010/0324823 A1 | 12/2010 | Kobayashi et al. |

(Continued)

FOREIGN PATENT DOCUMENTS

| | | |
|---|---|---|
| JP | 2006-315491 A | 11/2006 |
| JP | 2008-195402 A | 8/2008 |

(Continued)

*Primary Examiner* — Navid Z. Mehdizadeh
(74) *Attorney, Agent, or Firm* — Sughrue Mion, PLLC

(57) ABSTRACT

A yaw angle return controller is configured to end first yaw angle return control at a predetermined time when a value which is calculated by adding yaw angle detected by a lane recognition device at a predetermined time and an estimated yaw angle change amount is the same as yaw angle at lane change start time under a state where the first yaw angle return control is being executed. The predetermined time comes after the first start time and before the first finish time. The estimated yaw angle change amount is calculated by multiplying the yaw rate detected by a yaw rate sensor at the predetermined time by a predetermined time period for foreseeing.

5 Claims, 16 Drawing Sheets

(56) References Cited

U.S. PATENT DOCUMENTS

| | | | |
|---|---|---|---|
| 2012/0166017 A1* | 6/2012 | Kobayashi | B60T 7/22 701/1 |
| 2013/0054106 A1 | 2/2013 | Schmudderich et al. | |
| 2013/0293395 A1 | 11/2013 | Ohama et al. | |
| 2015/0100228 A1 | 4/2015 | Sudou et al. | |
| 2015/0151786 A1* | 6/2015 | Fujii | B62D 15/025 701/42 |
| 2015/0197249 A1 | 7/2015 | Sakima et al. | |
| 2015/0266477 A1 | 9/2015 | Schmudderich | |
| 2016/0107687 A1 | 4/2016 | Yamaoka | |
| 2016/0185388 A1 | 6/2016 | Sim | |
| 2016/0297447 A1 | 10/2016 | Suzuki | |
| 2017/0151982 A1 | 6/2017 | Fujii et al. | |
| 2017/0327115 A1 | 11/2017 | Tokimasa et al. | |
| 2017/0341652 A1 | 11/2017 | Sugawara et al. | |
| 2017/0349212 A1 | 12/2017 | Oshida et al. | |
| 2018/0015923 A1 | 1/2018 | Kurumisawa et al. | |
| 2018/0086338 A1 | 3/2018 | Yamada et al. | |
| 2018/0170388 A1 | 6/2018 | Shin | |
| 2018/0178790 A1 | 6/2018 | Oguri et al. | |
| 2018/0188735 A1 | 7/2018 | Sugawara et al. | |
| 2018/0253975 A1 | 9/2018 | Mizutani | |
| 2018/0261094 A1 | 9/2018 | Nishimura et al. | |
| 2018/0281785 A1 | 10/2018 | Berntorp et al. | |
| 2018/0346027 A1 | 12/2018 | Fujii | |
| 2018/0348779 A1 | 12/2018 | Oniwa | |
| 2019/0016339 A1 | 1/2019 | Ishioka | |

FOREIGN PATENT DOCUMENTS

| | | |
|---|---|---|
| JP | 4172434 B2 | 10/2008 |
| JP | 2009-190464 A | 8/2009 |
| JP | 4349210 B2 | 10/2009 |
| JP | 2010-006279 A | 1/2010 |
| JP | 4929777 B2 | 5/2012 |
| JP | 2014-148293 A | 8/2014 |
| JP | 2016-126360 A | 7/2016 |

\* cited by examiner

LANE CHANGE ASSIST DEVICE

CROSS-REFERENCE TO RELATED APPLICATIONS

The present application is a continuation of U.S. application Ser. No. 15/991,136 filed on May 29, 2018, in the U.S. Patent & Trademark Office, which is based on and claims priority under 35 U.S.C. § 119 to Japanese Patent Application No. 2017-111689 filed on Jun. 6, 2017, in the Japan Patent Office, the disclosures of which are incorporated by reference herein in their entireties.

BACKGROUND OF THE INVENTION

1. Field of the Invention

The present invention relates to a lane change assist device capable of executing a lane change assist control for supporting a steering operation to make a lane change.

2. Description of the Related Art

Japanese Patent Application Laid-open No. 2016-126360 discloses a lane change assist device capable of executing lane change assist control that supports a steering operation of a steeling wheel when a vehicle makes a lane change.

This lane change assist device can calculate a target trajectory on which a vehicle (hereinafter referred to as "own vehicle") equipped with a lane change assist device travels when the own vehicle makes a lane change from a lane on which the own vehicle is currently traveling (hereinafter referred to as "original lane") to a lane adjacent to the original lane (hereinafter referred to as "target lane"). Furthermore, the lane change assist device can control steered angles of steered wheels of the own vehicle so that the own vehicle travels along the calculated target trajectory.

Further, the lane change assist device determines whether or not a probability of collision between the own vehicle and another vehicle traveling on the target lane is high when the own vehicle is moved to the target lane along the calculated target trajectory. In other words, the lane change assist device determines whether or not a predetermined non-permission condition is established.

Then, the lane change assist device does not execute the lane change assist control when determining that the non-permission condition is established.

On the other hand, the lane change assist device executes the lane change assist control when the non-permission condition is not established.

That is, in this case, the lane change assist device controls the steered angles of the steered wheels of the own vehicle so that the own vehicle travels along the calculated target trajectory.

SUMMARY OF THE INVENTION

Japanese Patent Application Laid-open No. 2016-126360 does not disclose a mode for controlling the own vehicle by the lane change assist device when the non-permission condition is established after the lane change assist control is started.

The present invention has been made to cope with the above problems, and has an object to provide a lane change assist device capable of appropriately controlling a vehicle equipped with the lane change assist device when a non-permission condition is established after a lane change assist control is started.

In order to achieve the object, the lane change assist device of the present invention comprises:

a surrounding monitor (11) configured to monitor a surrounding of an own vehicle (C);

a lane recognition device (10, 12) configured to recognize a compartment line (WL) defining a side edge portion of a lane on which the own vehicle is traveling, and to detect a relative position of the own vehicle in a lane width direction with respect to the lane on which the own vehicle is traveling and detect a yaw angle ($\theta y$) with respect to an extension direction of the lane on which the own vehicle is traveling based on a positional relationship between the compartment line and the own vehicle, the lane recognition device being a camera sensor;

a yaw rate sensor (80) configured to detect a yaw rate of the own vehicle;

an actuator (22) configured to be capable of generating a diving force for changing a steered angle of a steered wheel of the own vehicle;

a lane change assist controller (10, 20) configured to start lane change assist control (LCA) at a predetermined lane change start time (t0), wherein the actuator is brought under the lane change assist control so that the own vehicle makes a lane change from an original lane on which the own vehicle is traveling to a target lane which is adjacent to the original lane based on the relative position detected by the lane recognition device;

a first interruption condition determiner (10) configured to make the lane change assist controller interrupt the lane change assist control when a predetermined first interruption condition is established after the lane change assist control is started, the first interruption condition being established when it is determined that a probability of the own vehicle colliding with another vehicle travelling on the target lane is high based on a monitoring result of the surrounding monitor, and a yaw angle return controller (10, 20) configured to execute first yaw angle return control.

The first yaw angle return control is started at a predetermined first start time (t1a) when the first interruption condition is established.

The yaw angle return controller executes the first yaw angle return control to bring the actuator under a feed forward control so that the yaw angle at a first finish time (t3a) becomes a value closer to the yaw angle at the lane change start time compared with the yaw angle at the first start time. The first finish time comes when a predetermined first control execution time (TC1) passes from the first start time.

The yaw angle return controller is configured to end the first yaw angle return control at a predetermined time (t2a-3) when a value which is calculated by adding the yaw angle detected by the lane recognition device at the predetermined time and an estimated yaw angle change amount is the same as the yaw angle at the lane change start time under a state where the first yaw angle return control is being executed. The predetermined time comes after the first start time and before the first finish time. The estimated yaw angle change amount is calculated by multiplying the yaw rate detected by the yaw rate sensor at the predetermined time by a predetermined time period for foreseeing.

The compartment line is, for example, a white line drawn on a road. Further, the white line includes, for example, a solid line and a dot-and-dash line.

The concept of "a value (which is calculated by adding the yaw angle detected by the lane recognition device at the predetermined time and an estimated yaw angle change amount) is the same as the yaw angle at the lane change start time" includes "the value is perfectly the same as the yaw angle at the lane change start time" and "the value is substantially the same as the yaw angle at the lane change start time".

For example, a gyro sensor can be used as the yaw rate sensor.

In the present invention, when the lane recognition device recognizes the compartment line defining the side edge portion of the lane, the lane recognition device detects the relative position of the own vehicle in the lane width direction with respect to the lane on which the own vehicle is traveling based on the positional relationship between the compartment line and the own vehicle.

Then, the lane change assist controller starts the lane change assist control at the lane change start time. The actuator for changing the steered angles of the steered wheels of the own vehicle is controlled under the lane change assist control so that the own vehicle travelling on the original lane makes a lane change from the original lane to the target lane.

After the lane change assist control is started, the first interruption condition determiner determines whether or not the predetermined first interruption condition is established based on the monitoring result of the surrounding monitor. The first interruption condition is established when it is determined that a probability of the own vehicle colliding with another vehicle travelling on the target lane is high.

Then, when the first interruption condition is determined to be established, the first interruption condition determiner makes the lane change assist controller interrupt the lane change assist control.

Then, when the first interruption condition is established and thus the lane change assist controller interrupts the lane change assist control, the yaw angle return controller executes the first yaw angle return control. The first yaw angle return control is started at the predetermined first start time. Under the first yaw angle return control, the actuator is brought under a feed forward control so that the yaw angle at the first finish time, which comes when the predetermined first control execution time passes from the first start time, is the value closer to the yaw angle at the lane change start time compared with the yaw angle at the first start time.

Typically, the yaw angle at the lane change start time is zero (or substantially zero).

Therefore, when the yaw angle of the own vehicle becomes equal to the value at the lane change start time by the first yaw angle return control, the yaw angle becomes zero (or substantially zero). Therefore, the own vehicle does not move in the lane width direction on the lane on which the own vehicle is traveling.

Incidentally, when the first yaw angle return control, which is a feed forward-control, is executed until the first finish time, the yaw angle at the first finish time can be assumed to be the same value as the yaw angle at the lane change start time. However, for example, an error may occur between an actual yaw angle at the first finish time and the yaw angle at the lane change start time due to a road surface condition of the road on which the own vehicle is travelling.

The value of an actual yaw angle can be detected by the camera sensor (the lane recognition device). Thus, the yaw angle of the own vehicle at the first finish time can be detected by the camera sensor.

Incidentally, the camera sensor detects (acquires) the yaw angle by photographing the compartment line, performing image processing on the acquired imaging data, and calculating based on the image processed data. That is, a predetermined yaw angle detection processing time period is required from when the camera sensor photographs (recognizes) the compartment line until when the camera sensor detects the yaw angle. Therefore, for example, when the camera sensor detects that the yaw angle is the predetermined angle α at a predetermined detection time, the actual yaw angle at a predetermined time before detection time, which goes back the yaw angle detection processing time period in time from the detection time, was likely to be the predetermined angle α. In other words, a certain amount of error was likely to be occurred between the actual yaw angle at the detection time and the predetermined angle α. Therefore, in the first yaw angle return control, the amount of error between the yaw angle detected by the camera sensor at the detection time and the actual yaw angle at the detection time tends to become large.

Therefore, in the first yaw angle return control, it cannot be accurately determined whether or not the yaw angle of the own vehicle at the first finish time is the same as the yaw angle at the lane change start time using the camera sensor.

Therefore, the yaw angle return controller of the present invention ends the first yaw angle return control at the predetermined time when the value which is calculated by adding the yaw angle detected by the camera sensor at the predetermined time and the estimated yaw angle change amount is the same as the yaw angle at the lane change start time. The predetermined time comes after the first start time and before the first finish time. The estimated yaw angle change amount is calculated by multiplying the yaw rate detected by the yaw rate sensor at the predetermined time by the predetermined time period for foreseeing.

Then, when the first yaw angle return control is ended at the time when the value calculated by adding the yaw angle detected by the camera sensor at the predetermined time and the estimated yaw angle change amount becomes zero, the yaw angle at the time when the first yaw angle return control is ended becomes substantially the same as the yaw angle at the lane change start time.

As described above, according to the present invention, it is possible to accurately determine whether or not the yaw angle of the own vehicle at the predetermined time becomes the same value as the yaw angle at the lane change start time by using the camera sensor (the lane recognition device).

In one aspect of the present invention,
the lane change assist controller is configured to:
execute original lane return control to control the actuator so that the own vehicle approaches a predetermined position of the original lane in the lane width direction after completion of the first yaw angle return control when a probability that the own vehicle collides with another vehicle in the case where the own vehicle approaches the predetermined position is low; and
start the original lane return control at the predetermined time when the value which is calculated by adding the yaw angle detected by the lane recognition device at the predetermined time under the first yaw angle return control and the estimated yaw angle change amount is the same as the yaw angle at the lane change start time.

When the first yaw angle return control is executed until the first finish time in the case where the yaw angle at the lane change start time is zero, the steered angles at the steered wheels are gradually reduced from the time near the first finish time to the first finish time, and then the steered angles of the steered wheels become zero at the first finish time. When the lane change assist controller subsequently executes the original lane return control, the steered angles of the steered wheels are increased from zero. That is, when the first yaw angle return control is executed until the first finish time and the original lane return control is subsequently executed, the steered angles of the steered wheels temporary become zero from values greater than zero, and subsequently become greater than zero again.

In this case, for example, when the rotation direction of each of the steered wheels in a plan view under execution of the first yaw angle return control is the left side (counter-clockwise direction) and the rotation direction of each of the steered wheels in the plan view under the original lane return control is the left side, an occupant of the own vehicle is easy to feel uncomfortable. Likewise, when the rotation direction of each of the steered wheels in the plan view under execution of the first yaw angle return control is the right side (clockwise direction) and the rotation direction of each of the steered wheels in the plan view under the original lane return control is the right side, the occupant of the own vehicle is easy to feel uncomfortable.

However, as in the present invention, when the first yaw angle return control is ended at the predetermined time, the steered angles of the steered wheels at the predetermined time become values larger than zero.

Therefore, for example, even when the rotation direction of the steered wheels in the plan view during execution of the first yaw angle return control is the left side and the rotation direction of the steered wheels in the plan view under the original lane return control is the left side, the occupant of the own vehicle is hard to feel uncomfortable.

In the above description, references used in the following descriptions regarding embodiments are added with parentheses to the elements of the present invention, in order to understand the invention. However, those references should not be used to limit the scope of the present invention.

Other objects, other features, and accompanying advantages of the present invention are easily understood from the description of embodiments of the present invention to be given referring to the following drawings.

DETAILED DESCRIPTION OF THE PREFERRED EMBODIMENTS

Referring to the accompanying drawings, a steering assist device for a vehicle according to an embodiment of the present invention is described below.

Figure 1:
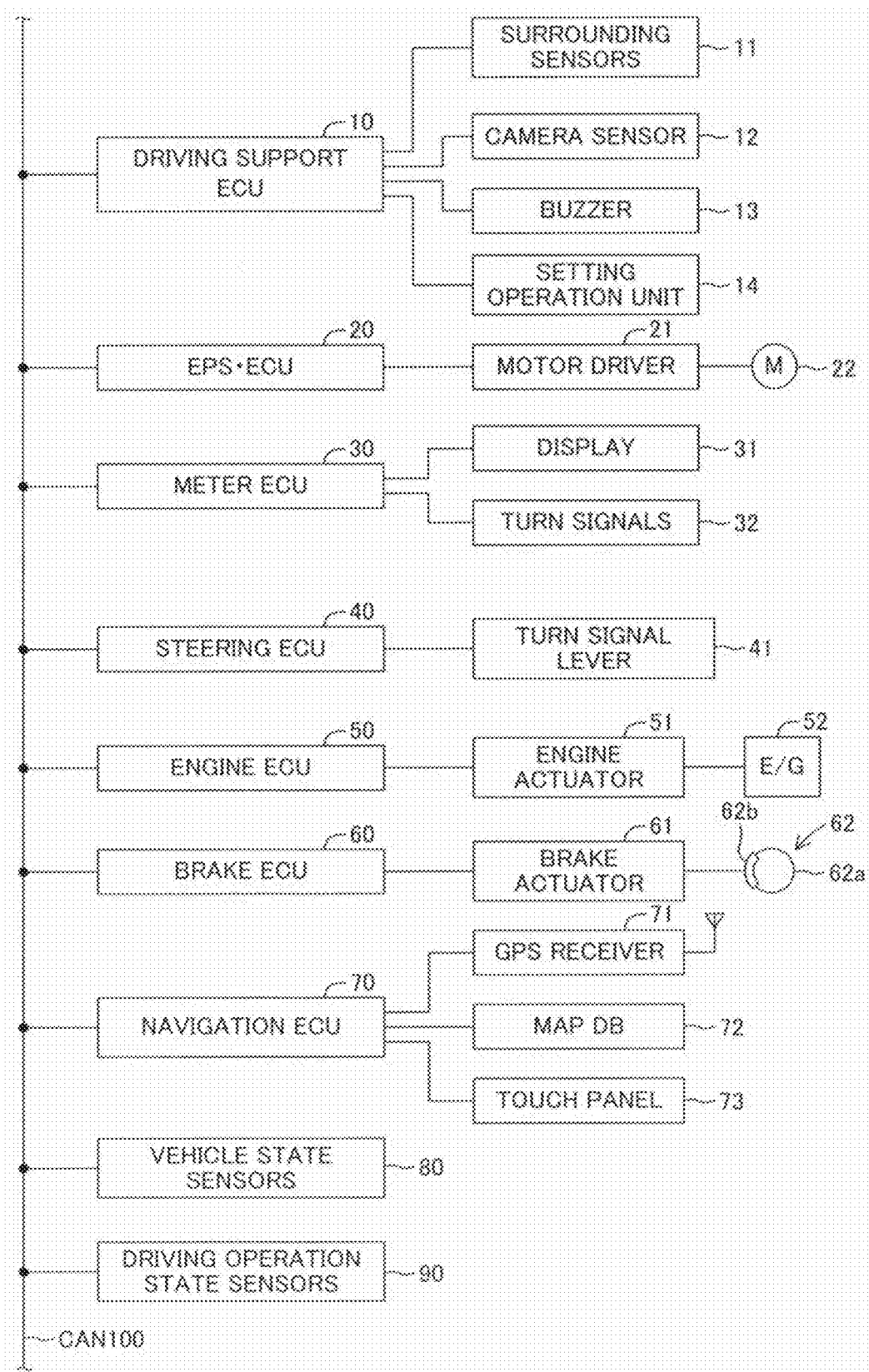
FIG. 1 is a schematic configuration diagram for illustrating a steering assist device according to an embodiment of the present invention.

The steering assist device according to the embodiment of the present invention is applied to a vehicle (hereinafter it may be also referred to as "own vehicle" in order to distinguish from other vehicles), and as illustrated in FIG. 1, includes a driving support ECU 10, an electric power steering ECU 20, a meter ECU 30, a steering ECU 40, an engine ECU 50, a brake ECU 60, and a navigation ECU 70.

Those ECUs are electric control units each including a microcomputer as a main part, and are connected to one another so as to be able to mutually transmit and receive information via a controller area network (CAN) 100. The microcomputer herein includes a CPU, a ROM, a RAM, a nonvolatile memory, an interface I/F, and the like. The CPU executes instructions (programs and routines) stored in the ROM to implement various functions. Some or all of those ECUs may be integrated into one ECU.

A plurality of types of vehicle state sensors 80 configured to detect a vehicle state and a plurality of types of driving operation state sensors 90 configured to detect a driving operation state are connected to the CAN 100. Examples of the vehicle state sensors 80 include a vehicle speed sensor configured to detect a travel speed of the vehicle, a front-rear G sensor configured to detect an acceleration of the vehicle in a front-rear direction, a lateral G sensor configured to detect an acceleration of the vehicle in a lateral direction, and a yaw rate sensor configured to detect a yaw rate of the vehicle. In this embodiment, a gyro sensor is used as the yaw rate sensor.

Examples of the driving operation state sensors 90 include an accelerator operation amount sensor configured to detect an operation amount of an accelerator pedal, a brake operation amount sensor configured to detect an operation amount of a brake pedal, a brake switch configured to detect presence or absence of the operation on the brake pedal, a steering angle sensor configured to detect a steering angle, a steering torque sensor configured to detect a steering torque, and a shift position sensor configured to detect a shift position of a transmission.

Information (called "sensor information") detected by the vehicle state sensors 80 and the driving operation state sensors 90 is transmitted to the CAN 100. In each ECU, the sensor information transmitted to the CAN 100 can be used as appropriate. The sensor information is information of a sensor connected to a specific ECU, and may be transmitted from the specific ECU to the CAN 100. For example, the accelerator operation amount sensor may be connected to the engine ECU 50. In this case, the sensor information representing the accelerator operation amount is transmitted from the engine ECU 50 to the CAN 100. For example, the steering angle sensor may be connected to the steering ECU 40. In this case, the sensor information representing the steering angle is transmitted from the steering ECU 40 to the CAN 100. The same applies to the other sensors. Further, there may be employed a configuration in which, without interpolation of the CAN 100, the sensor information is transmitted and received through direct communication between specific ECUs.

Figure 2:
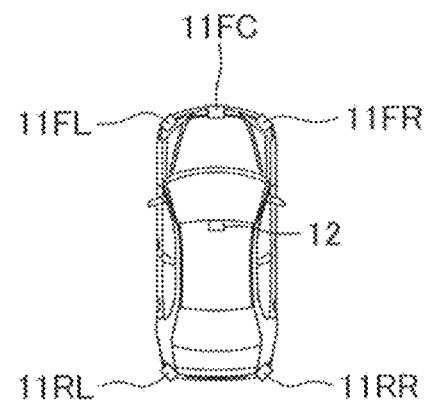
FIG. 2 is a plan view for illustrating mounting positions of surrounding sensors and a camera sensor.

The driving support ECU 10 is a control device serving as a main device for performing driving support for a driver, and executes lane change assist control, lane trace assist control, and adaptive cruise control. As illustrated in FIG. 2, a front-center surrounding sensor 11FC, a front-right surrounding sensor 11FR, a front-left surrounding sensor 11FL, a rear-right surrounding sensor 11RR, and a rear-left surrounding sensor 11RL are connected to the driving support ECU 10. The surrounding sensors 11FC, 11FR, 11FL, 11RR, and 11RL are radar sensors, and basically have the same configuration except that the sensors have different detection regions. In the following, the surrounding sensors 11FC, 11FR, 11FL, 11RR, and 11RL are called "surrounding sensors 11" when the sensors are not required to be individually distinguished from one another.

Each of the surrounding sensors 11 includes a radar transceiver and a signal processor (not shown). The radar transceiver radiates a radio wave in a millimeter waveband (hereinafter referred to as "millimeter wave"), and receives a millimeter wave (that is, reflected wave) reflected by a three-dimensional object (e.g., other vehicles, pedestrian, bicycle, and building) present within a radiation range. The signal processor acquires, every time a predetermined time period elapses, information (hereinafter called "surrounding information") representing, for example, a distance between the own vehicle and the three-dimensional object, a relative speed between the own vehicle and the three-dimensional object, and a relative position (direction) of the three-dimensional object with respect to the own vehicle based on, for example, a phase difference between the transmitted millimeter wave and the received reflected wave, an attenuation level of the reflected wave, and a time period required from transmission of the millimeter wave to reception of the reflected wave. Then, the signal processor transmits the surrounding information to the driving support ECU 10. The surrounding information can be used to detect a front-rear direction component and a lateral direction component in the distance between the own vehicle and the three-dimensional object and a front-rear direction component and a lateral direction component in the relative speed between the own vehicle and the three-dimensional object.

As illustrated in FIG. 2, the front-center surrounding sensor 11FC is provided at a front-center portion of a vehicle body, and detects a three-dimensional object present in a front region of the own vehicle. The front-right surrounding sensor 11FR is provided at a front-right corner portion of the vehicle body, and mainly detects a three-dimensional object present in a front-right region of the own vehicle. The front-left surrounding sensor 11FL is provided at a front-left corner portion of the vehicle body, and mainly detects a three-dimensional object present in a front-left region of the own vehicle. The rear-right surrounding sensor 11RR is provided at a rear-right corner portion of the vehicle body, and mainly detects a three-dimensional object present in a rear-right region of the own vehicle. The rear-left surrounding sensor 11RL is provided at a rear-left corner portion of the vehicle body, and mainly detects a three-dimensional object present in a rear-left region of the own vehicle.

In this embodiment, the surrounding sensors 11 are radar sensors, but other sensors such as clearance sonars and light detection and ranging (LI DAR) sensors can be employed instead.

Further, a camera sensor 12 is connected to the driving support ECU 10. The camera sensor 12 includes a camera unit and a lane recognition unit configured to analyze image data obtained based on an image taken by the camera unit to recognize a white line of a road. The camera sensor 12 (camera unit) photographs a landscape in front of the own vehicle. The camera sensor 12 (lane recognition unit) repeatedly supplies information relating to the recognized white line to the driving support ECU 10 at predetermined calculation periods.

The camera sensor 12 is capable of recognizing a lane representing a region sectioned by white lines, and detecting a relative positional relation of the own vehicle with respect to the lane based on a positional relation between the white lines and the own vehicle. The position of the own vehicle is the center of gravity of the own vehicle. A lateral position, which is described later, of the own vehicle represents the position of the center of gravity of the own vehicle in the lane width direction, a lateral speed of the own vehicle represents the speed of the center of gravity of the own vehicle in the lane width direction, and a lateral acceleration of the own vehicle represents the acceleration of the center of gravity of the own vehicle in the lane width direction. The lateral position, the lateral speed, and the lateral acceleration are determined based on the relative positional relation between the white lines detected by the camera sensor 12 and the own vehicle. In this embodiment, the position of the own vehicle is the center of gravity. However, the position of the own vehicle is not limited to the center of gravity, and a specific position set in advance (e.g., a center position in a planar view) can also be used as the position of the own vehicle.

Figure 3:
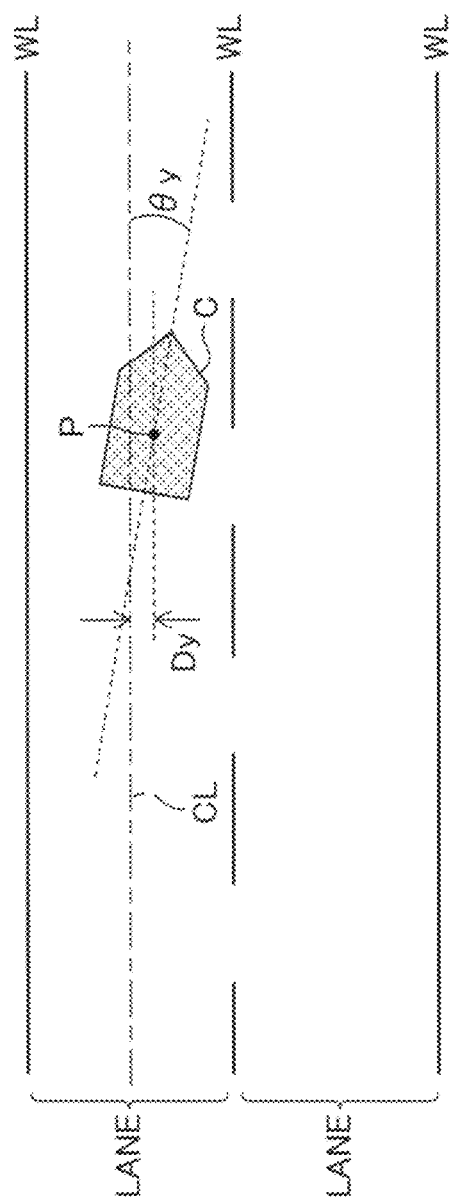
FIG. 3 is a diagram for illustrating lane-related vehicle information.

As illustrated in FIG. 3, the camera sensor 12 determines a lane center line CL corresponding to a center position of a lane on which the own vehicle is traveling in a width direction of right and left white lines WL. The lane center line CL is used as a target travel line in the lane trace assist control to be described later. Further, the camera sensor 12 calculates a curvature Cu of a curve of the lane center line CL.

The camera sensor 12 also calculates the position and the direction of the own vehicle in the lane sectioned by the right and left white lines WL. For example, as illustrated in FIG. 3, the camera sensor 12 calculates a distance Dy (m) in a lane width direction between a center of gravity point P of an own vehicle C and the lane center line CL, namely, the distance Dy by which the own vehicle C is shifted from the lane center line CL in the lane width direction. This distance Dy is referred to as "lateral deviation Dy". The camera sensor 12 also calculates an angle formed between the direction of the lane center line CL and the direction in which the own vehicle C faces, namely, an angle θy (rad) by which the direction in which the own vehicle C faces is shifted in a horizontal direction from the direction of the lane center line CL. This angle θy is referred to as "yaw angle θy". When the lane is curved, the lane center line CL is also curved, and thus the yaw angle θy represents the angle by which the direction in which the own vehicle C faces is shifted from the curved lane center line CL. In the following, information (Cu, Dy, and θy) representing the curvature Cu, the lateral deviation Dy, and the yaw angle θy is referred to as "lane-related vehicle information". The right and left directions of the lateral deviation Dy and the yaw angle θy with respect to the lane center line CL are identified by a sign (plus or minus). Regarding the curvature Cu, the direction of the curve (right or left) is identified by a sign (plus or minus).

Further, the camera sensor 12 also supplies, to the driving support ECU 10, information relating to the white line, for example, the type of the detected white line (solid line or broken line), a distance (lane width) between the right and left adjacent white lines, and the shape of the white line, on not only the lane on which the own vehicle is positioned but also on adjacent lanes on predetermined calculation periods. When the white line is a solid line, the vehicle is inhibited from crossing the white line to change the lane. Otherwise, when the white line is a broken line (white line intermittently formed at certain intervals), the vehicle is allowed to cross the white line to change the lane. The lane-related vehicle information (Cu, Dy, and θy) and the information relating to the white line are collectively referred to as "lane information".

In this embodiment, the camera sensor 12 calculates the lane-related vehicle information (Cu, Dy, and θy). However, in place of the camera sensor 12, the driving support ECU 10 may acquire the lane information by analyzing the image data output from the camera sensor 12.

Further, the camera sensor 12 can also detect a three-dimensional object present in front of the own vehicle based on the image data. Therefore, not only the lane information but also front surrounding information may be acquired through calculation. In this case, for example, there may be provided a synthesis processor (not shown) configured to synthesize the surrounding information acquired by the front-center surrounding sensor 11FC, the front-right surrounding sensor 11FR, and the front-left surrounding sensor 11FL and the surrounding information acquired by the camera sensor 12 to generate front surrounding information having a high detection accuracy, and the surrounding information generated by the synthesis processor may be supplied to the driving support ECU 10 as the front surrounding information on the own vehicle.

As illustrated in FIG. 1, a buzzer 13 is connected to the driving support ECU 10. The buzzer 13 produces a sound when receiving a buzzer sounding signal from the driving support ECU 10. The driving support ECU 10 sounds the buzzer 13 when, for example, the driving support ECU 10 notifies the driver of a driving support situation, or when the driving support ECU 10 alerts the driver.

In this embodiment, the buzzer 13 is connected to the driving support ECU 10, but the buzzer 13 may be connected to other ECUs, for example, a notification ECU (not shown) dedicated for notification, and the buzzer 13 may be sounded by the notification ECU. In this case, the driving support ECU 10 transmits a buzzer sounding command to the notification ECU.

Further, instead of or in addition to the buzzer 13, a vibrator for transmitting vibration for notification to the driver may be provided. For example, the vibrator is provided to a steering wheel to vibrate the steering wheel, to thereby alert the driver.

The driving support ECU 10 executes the lane change assist control, the lane trace assist control, and the adaptive cruise control based on the surrounding information supplied from the surrounding sensors 11, the lane information obtained based on the white line recognition by the camera sensor 12, the vehicle state detected by the vehicle state sensors 80, the driving operation state detected by the driving operation state sensors 90, and the like.

A setting operation unit 14 to be operated by the driver is connected to the driving support ECU 10. The setting operation unit 14 is an operation unit for performing setting or the like regarding whether or not to execute each of the lane change assist control, the lane trace assist control, and the adaptive cruise control. The driving support ECU 10 receives a setting signal as input from the setting operation unit 14 to determine whether or not to execute each control. In this case, when the execution of the adaptive cruise control is not selected, the lane change assist control and the lane trace assist control are also automatically set to be unexecuted. Further, when the execution of the lane trace assist control is not selected, the lane change assist control is also automatically set to be unexecuted.

Further, the setting operation unit 14 has a function of inputting parameters or the like representing the preference of the driver when the above-mentioned control is executed.

The electric power steering ECU 20 is a control device for an electric power steering device. In the following, the electric power steering ECU 20 is called "EPS•ECU 20". The EPS•ECU 20 is connected to a motor driver 21. The motor driver 21 is connected to a steering motor 22. The steering motor 22 is integrated into a "steering mechanism including the steering wheel, a steering shaft coupled to the steering wheel, a steering gear mechanism, and the like" (not shown) of the vehicle. The EPS•ECU 20 detects the steering torque that is input by the driver to the steering wheel (not shown) by a steering torque sensor provided to the steering shaft, and controls energization to the motor driver 21 based on the steering torque to drive the steering motor 22. The assist motor is driven as described above so that the steering torque is applied to the steering mechanism, and thus the steering operation of the driver is assisted.

Further, when the EPS•ECU 20 receives a steering command from the driving support ECU 10 via the CAN 100, the EPS•ECU 20 drives the steering motor 22 at a control amount indicated by the steering command to generate a steering torque. This steering torque represents a torque to be applied to the steering mechanism in response to the steering command from the driving support ECU 10, which does not require the driver's steering operation (steering wheel operation) unlike a steering assist torque to be applied for alleviating the driver's steering operation described above.

Even in a case where a steering command is received from the driving support ECU 10, when a steering torque from a steering wheel operation by the driver is detected and that steering torque is larger than a threshold, the EPS•ECU 20 prioritizes the steering wheel operation by the driver and generates a steering assist torque that lightens the steering wheel operation.

The meter ECU 30 is connected to a display unit 31 and right and left turn signals 32 (meaning turn signal lamps and sometimes also called "turn lamps"). The display unit 31 is, for example, a multi-information display provided in front of a driver's seat, and displays various types of information in addition to values measured by meters, for example, a vehicle speed. For example, when the meter ECU 30 receives a display command in accordance with the driving support state from the driving support ECU 10, the meter ECU 30 causes the display unit 31 to display a screen instructed in the display command. As the display unit 31, instead of or in addition to the multi-information display, a head-up display (not shown) can also be employed. When the head-up display is employed, it is preferred to provide a dedicated ECU for controlling the display on the head-up display.

Further, the meter ECU 30 includes a turn signal drive circuit (not shown). When the meter ECU 30 receives a turn signal flashing command via the CAN 100, the meter ECU 30 flashes the turn signal 32 arranged in a right or left direction instructed by the turn signal flashing command. Further, while the meter ECU 30 flashes the turn signal 32, the meter ECU 30 transmits, to the CAN 100, turn signal flashing information representing that the turn signal 32 is in a flashing state. Therefore, other ECUs can recognize the flashing state of the turn signal 32.

The steering ECU 40 is connected to a turn signal lever 41. The turn signal lever 41 is an operation unit for actuating (flashing) the turn signal 32, and is provided to a steering column. The turn signal lever 41 is provided to be swingable at a two-stage operation stroke about a support shaft in each of a counterclockwise operation direction and a clockwise operation direction.

Figure 4:
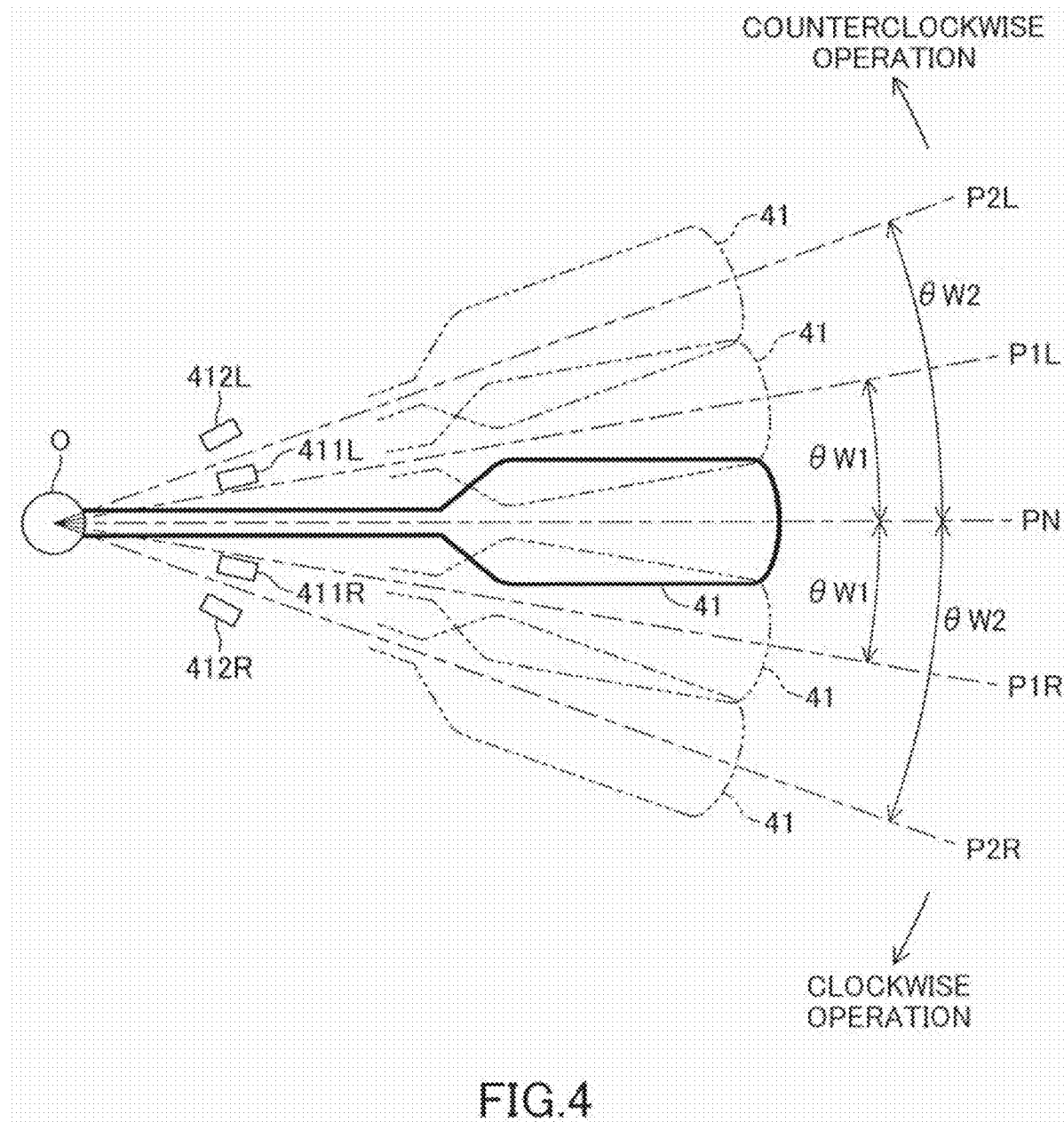
FIG. 4 is a diagram for illustrating actuation of a turn signal lever.

The turn signal lever 41 in this embodiment also acts as an operation device for requesting lane change assist control by the driver. As illustrated in FIG. 4, the turn signal lever 41 is configured to be capable of being selectively operated between a first stroke position P1L (P1R), which is a position rotated by a first angle θW1 from a neutral position PN, and a second stroke position P2L (P2R), which is a position rotated by a second angle θW2 (>θW1) from the neutral position PN, in each of the clockwise operation direction and the counterclockwise operation direction about the support shaft O. When the turn signal lever 41 is moved to the first stroke position P1L (P1R) by a lever operation by the driver, the turn signal lever 41 returns to the neutral position PN when the lever operation force by the driver is released. When the turn signal lever 41 is moved to the second stroke position P2L (P2R) by a lever operation by the driver, the turn signal lever 41 is held at the second stroke position P2L (P2R) by a lock mechanism even when the lever force is released. Under a state in which the turn signal lever 41 is held at the second stroke position P2L (P2R), when the steering wheel is reversely rotated and returned to the neutral position, or when the driver operates and returns the turn signal lever 41 to the neutral position, the locking by the lock mechanism is released, and the turn signal lever 41 is returned to the neutral position PN.

The turn signal lever 41 includes a first switch 411L (411R) that turns on (generates an ON signal) only when the turn signal lever 41 is positioned at the first stroke position P1L (P1R), and a second switch 412L (412R) that turns on (generates an ON signal) only when the turn signal lever 41 is positioned at the second operation position P2L (P2R).

The steering ECU 40 detects the operation state of the turn signal lever 41 based on the presence/absence of the ON signal from the first switch 411L (411R) and the second switch 412L (412R). When the turn signal lever 41 is in a state tilted to the first stroke position P1L (P1R) and when the turn signal lever 41 is in a state tilted to the second stroke position P2L (P2R), the steering ECU 40 transmits, to the meter ECU 30, a turn signal flashing command including information representing the operation direction (right or left).

The steering ECU 40 outputs, when the turn signal lever 41 is detected as having been continuously held at the first stroke position P1L (P1R) for a set time (lane change request confirmation time: e.g., 1 second) or more set in advance, to the driving support ECU 10 a lane change assist request signal including information representing that operation direction (right or left). Therefore, when the driver wishes to receive lane change assist during driving, the driver is only required to tilt the turn signal lever 41 to the first stroke position P1L (P1R) corresponding to the lane change direction and maintain that state for the set time or more. This operation is referred to as a lane change assist request operation.

In this embodiment, the turn signal lever 41 is used as the operation device for the driver to request lane change assist. However, in place of the turn signal lever 41, a dedicated lane change assist request operation device may be arranged on the steering wheel, for example.

The engine ECU 50 illustrated in FIG. 1 is connected to an engine actuator 51. The engine actuator 51 is an actuator for changing an operation state of an internal combustion engine 52. In this embodiment, the internal combustion engine 52 is a gasoline fuel injection, spark ignition, multi-cylinder engine, and includes a throttle valve for adjusting an intake air amount. The engine actuator 51 includes at least a throttle valve actuator for changing an opening degree of the throttle valve. The engine ECU 50 can drive the engine actuator 51, thereby changing a torque generated by the internal combustion engine 52. The torque generated by the internal combustion engine 52 is transmitted to drive wheels (not shown) via a transmission (not shown). Thus, the engine ECU 50 can control the engine actuator 51 to control a driving force of the own vehicle, thereby changing an acceleration state (acceleration).

The brake ECU 60 is connected to a brake actuator 61. The brake actuator 61 is provided in a hydraulic circuit between a master cylinder (not shown) configured to pressurize a working fluid with a stepping force on a brake pedal and friction brake mechanisms 62 provided on the front/rear left/right wheels. The friction brake mechanism 62 includes a brake disk 62a fixed to wheels and a brake caliper 62b fixed to a vehicle body. The brake actuator 61 is configured to adjust a hydraulic pressure supplied to a wheel cylinder built into the brake caliper 62b in accordance with an instruction from the brake ECU 60 to use the hydraulic pressure to operate the wheel cylinder, thereby pressing a brake pad against the brake disk 62a and generating a friction braking force. Thus, the brake ECU 60 can control the brake actuator 61, thereby controlling the braking force of the own vehicle to change a deceleration state (deceleration).

The navigation ECU 70 includes a GPS receiver 71 configured to receive a GPS signal for detecting a current position of the own vehicle, a map database 72 having map information and the like stored therein, and a touch panel (touch panel-type display) 73. The navigation ECU 70 identifies the position of the own vehicle at the current time point based on the GPS signal, and performs various types of calculation processing based on the position of the own vehicle and the map information stored in the map database 72 and the like, to thereby perform route guidance with use of the touch panel 73.

The map information stored in the map database 72 includes road information. The road information includes parameters (e.g., road curvature radius or curvature, the road lane width, number of road lanes, and the position of the lane center line in each road lane) indicating the position and shape of the road. Further, the road information includes road type information for enabling distinction of whether or not the road is a road for exclusive use by automobiles, for example.

<Control Processing Performed by Driving Support ECU 10>

Next, control processing performed by the driving support ECU 10 is described. Under a situation in which both of the lane trace assist control and the adaptive cruise control are executed, when the lane change assist request is accepted, the driving support ECU 10 executes the lane change assist control. In view of this, the lane trace assist control and the adaptive cruise control are first described.

<Lane Trace Assist Control (LTA)>

The lane trace assist control applies the steering torque to the steering mechanism so that the position of the own vehicle is maintained in a vicinity of the target travel line inside a "lane on which the own vehicle is traveling", thereby assisting the steering operation of the driver. In this embodiment, the target travel line is the lane center line CL, but a line offset in the lane width direction by a predetermined distance from the lane center line CL can also be adopted.

In the following, the lane trace assist control is called "LTA". The LTA is widely known (e.g., refer to Japanese Patent Application Laid-open No. 2008-195402, Japanese Patent Application Laid-open No. 2009-190464, Japanese Patent Application Laid-open No. 2010-6279, and Japanese Patent No. 4349210) although the LTA itself has different names. Thus, a brief description is now given of the LTA.

The driving support ECU 10 is configured to carry out the LTA when the LTA is requested by the operation on the setting operation unit 14. When the LTA is requested, the driving support ECU 10 calculates a target steering angle $\theta lta^*$ at a predetermined calculation cycle in accordance with Expression (1) based on the above-mentioned lane-related vehicle information (Cu, Dy, and $\theta y$).

$$\theta lta^* = Klta1 \cdot Cu + Klta2 \cdot \theta y + Klta3 \cdot Dy + Klta4 \cdot \Sigma Dy \quad (1)$$

In Expression (1), Klta1, Klta2, Klta3, and Klta4 are control gains. The first term on the right-hand side is a steering angle component that is determined in accordance with the curvature Cu of the road and acts in a feed-forward manner. The second term on the right-hand side is a steering angle component that acts in the feed-back manner so that the yaw angle $\theta y$ is decreased (so that the difference of the direction of the own vehicle with respect to the lane center line CL is decreased). That is, the second term on the right-hand side is a steering angle component calculated by feed-back control with the target value of the yaw angle $\theta y$ being set to zero. The third term on the right-hand side is a steering angle component that acts in a feed-back manner so that the lateral difference Dy, which is a positional shift (positional difference) in the lane width direction of the own vehicle with respect to the lane center line CL, is decreased. That is, the third term on the right-hand side is a steering angle component calculated by feed-back control with the target value of the lateral difference Dy being set to zero. The fourth term on the right-hand side is a steering angle component that acts in a feed-back manner so that an integral value $\Sigma Dy$ of the lateral difference Dy is decreased. That is, the fourth term on the right-hand side is a steering angle component calculated by feed-back control with the target value of the integral value $\Sigma Dy$ being set to zero.

The target steering angle $\theta lta^*$ is set as the steering angle of the left direction, for example, when the lane center line CL is curved in the left direction, when the own vehicle is laterally shifted in the right direction with respect to the lane center line CL, and when the own vehicle is facing the right direction with respect to the lane center line CL. Further, the target steering angle $\theta lta^*$ is set as the steering angle of the right direction when the lane center line CL is curved in the right direction, when the own vehicle is laterally shifted in the left direction with respect to the lane center line CL, and when the own vehicle is facing the left direction with respect to the lane center line CL. Therefore, the driving support ECU 10 calculates Expression (1) with use of signs corresponding to the right/left directions.

The driving support ECU 10 outputs, to the EPS·ECU 20, a command signal representing the target steering angle $\theta lta^*$ that is the calculation result. The EPS·ECU 20 controls the drive of the steering motor 22 so that the steering angle follows the target steering angle $\theta lta^*$. In this embodiment, the driving support ECU 10 outputs the command signal representing the target steering angle $\theta lta^*$ to the EPS·ECU 20, but the driving support ECU 10 may calculate a target torque for obtaining the target steering angle $\theta lta^*$, and output, to the EPS·ECU 20, a command signal representing the target torque that is the calculation result.

The driving support ECU 10 issues a lane departing alert by, for example, sounding the buzzer 13 when the own vehicle has a probability of moving outside the lane while departing from the lane.

The above is the outline of the LTA.

<Adaptive Cruise Control (ACC)>

The adaptive cruise control refers to the following control. When a preceding vehicle traveling ahead of the own vehicle is present, the own vehicle is caused to follow the preceding vehicle while maintaining an inter-vehicle distance between the preceding vehicle and the own vehicle to a predetermined distance based on the surrounding information. When there is no preceding vehicle, the own vehicle is caused to travel at a constant setting vehicle speed. In the following, the adaptive cruise control is called "ACC". The ACC itself is widely known (e.g., refer to Japanese Patent Application Laid-open No. 2014-148293, Japanese Patent Application Laid-open No. 2006-315491, Japanese Patent No. 4172434, and Japanese Patent No. 4929777). Thus, a brief description is now given of the ACC.

The driving support ECU 10 is configured to carry out the ACC when the ACC is requested by the operation on the setting operation unit 14. That is, the driving support ECU 10 is configured to select a following subject vehicle based on the surrounding information acquired from the surrounding sensors 11 when the ACC is requested. For example, the driving support ECU 10 determines whether or not another vehicle exists in a following subject vehicle area defined in advance.

When another vehicle is present in the following subject vehicle area for a time equal to or more than a predetermined time, the driving support ECU 10 selects that another vehicle as the following subject vehicle, and sets a target acceleration so that the own vehicle follows the following subject vehicle while keeping a predetermined inter-vehicle distance between the own vehicle and the following subject vehicle. When another vehicle is not present in the following subject vehicle area, the driving support ECU 10 sets the target acceleration based on the set vehicle speed and the detected speed (vehicle speed detected by the vehicle speed sensor) so that the speed of the own vehicle matches the set vehicle speed.

The driving support ECU 10 uses the engine ECU 50 to control the engine actuator 51, and, depending on necessity, uses the brake ECU 60 to control the brake actuator 61 so that the acceleration of the own vehicle matches the target acceleration.

When an accelerator operation is performed by the driver during ACC, the accelerator operation is prioritized, and automatic deceleration control for keeping the inter-vehicle distance between the preceding vehicle and the own vehicle is not performed.

The above is the outline of the ACC.

<Lane Change Assist Control (LCA)>

The lane change assist control refers to the following control. After the surrounding of the own vehicle is monitored and it is determined that the own vehicle can safely change the lane, a steering torque is applied to the steering mechanism so that the own vehicle is moved from the lane on which the own vehicle is currently traveling to the adjacent lane while the surrounding of the own vehicle is monitored. Thus, the driver's steering operation (lane change operation) is assisted. Therefore, with the lane change assist control, the lane on which the own vehicle travels can be changed without the driver's steering operation (steering wheel operation). In the following, the lane change assist control is called "LCA".

Similarly to the LTA, the LCA is control of a lateral position of the own vehicle with respect to the lane, and is executed in place of the LTA when the lane change assist request is accepted while the LTA and the ACC are executed. In the following, the LTA, the LCA, original lane return control described later, first yaw angle return control described later, and second yaw angle return control described later are collectively referred to as "steering assist control", and the state of the steering assist control is called "steering assist control state".

The steering assist device executes control for assisting the steering operation by the driver. Therefore, when steering assist control (LTA, LCA, original lane return control, first yaw angle return control, and second yaw angle return control) is to be executed, the driving support ECU 10 generates a steering torque for steering assist control so that the steering wheel operation by the driver is prioritized. As a result, the driver can cause the own vehicle to move in an intended direction based on the steering wheel operation by the driver even when the steering assist control is executed.

Figure 5:
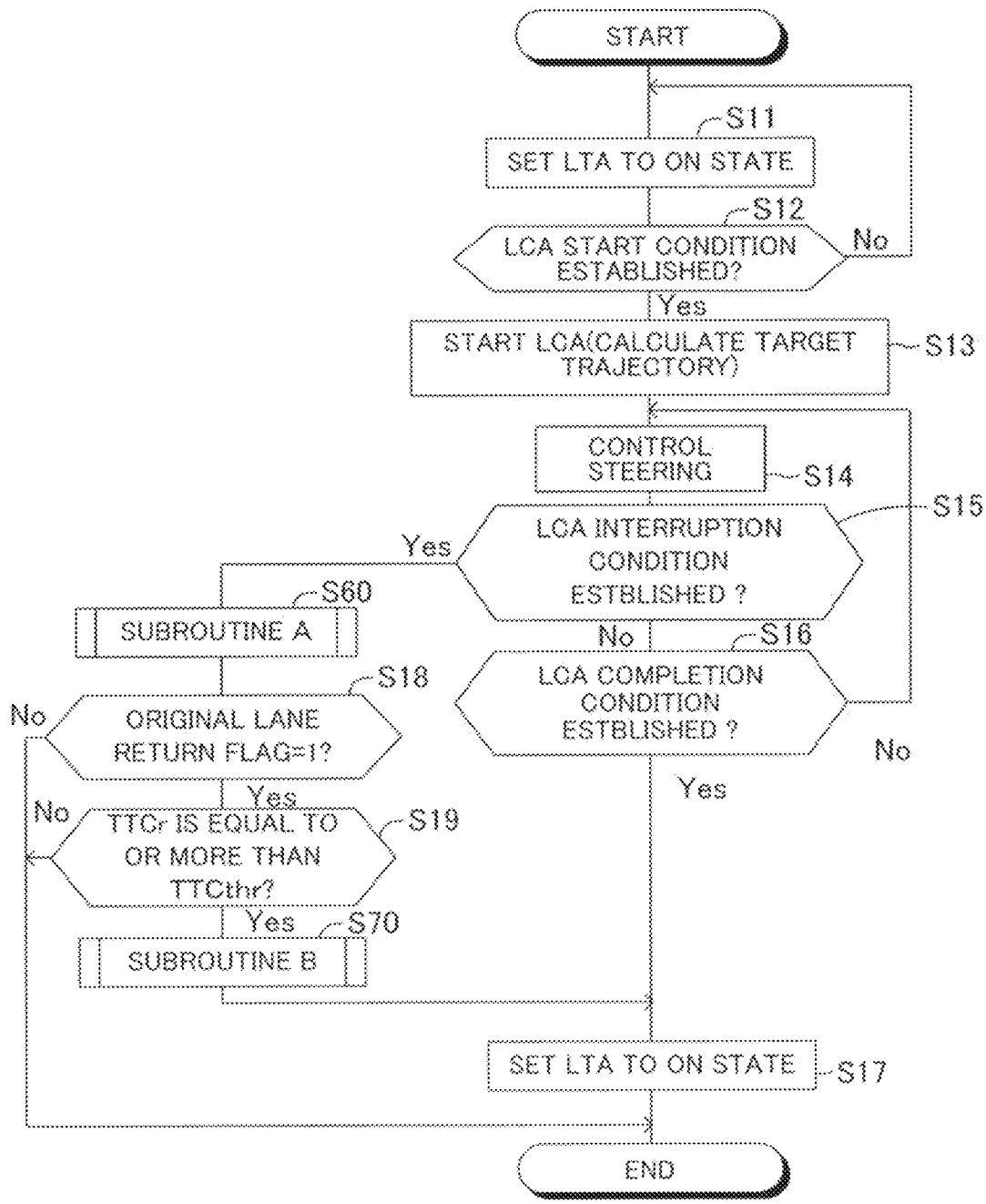
FIG. 5 is a flowchart for illustrating a steering assist control routine.

FIG. 5 is a flowchart for illustrating a steering assist control routine executed by the driving support ECU 10. The steering assist control routine is executed when an LTA execution permission condition is established. The LTA execution permission condition may be, for example, the fact that execution of the LTA is selected by the setting operation unit 14, the fact that ACC is being executed, and/or the fact that white lines can be recognized by the camera sensor 12.

In Step S11, when the steering assist control routine is started, the driving support ECU 10 sets the steering assist control state to an LTA ON state. The LTA ON state represents the control state in which the LTA is to be executed.

Next, in Step S12, the driving support ECU 10 determines whether or not an LCA start condition is established.

The LCA start condition is established when, for example, all of the following conditions are established.

1. A lane change assist request operation (lane change assist request signal) is detected.

2. The execution of the LCA is selected by the setting operation unit 14.

3. The camera sensor 12 recognizes a relative position of the own vehicle with respect to the lane in the lane width direction and the white line present in the turn signal operation direction (the white line serving as a boundary between the original lane and the target lane) is a broken line.

4. The result of determining whether or not the LCA can be executed due to the monitoring of the surrounding is YES (object (another vehicle or the like) that becomes an obstacle during the lane change is not detected based on the surrounding information acquired from the surrounding sensors 11, and it is determined that the own vehicle can safely change the lane).

5. The road is a road for exclusive use by automobiles (road type information acquired from the navigation ECU 70 indicates a road for exclusive use by automobiles).

6. The vehicle speed of the own vehicle is within an LCA permitted vehicle speed range.

For example, the condition 4 is established when the inter-vehicle distance between the own vehicle and another vehicle after the lane change is estimated to be appropriately secured based on the relative speed between the own vehicle and another vehicle traveling on the target lane.

Noted that, when, for example, the camera sensor 12 recognizes the white lines of left and right sides of the lane on which the own vehicle is traveling simultaneously, the camera sensor 12 can recognize the relative position of the own vehicle with respect to the lane in the lane width direction. Further, when the camera sensor 12 recognizes the lane width of each lane of the road on which the own vehicle is traveling and the camera sensor 12 recognizes at least one of the white lines, the camera sensor 12 can recognize the relative position of the own vehicle with respect to the lane in the lane width direction. On the other hand, when the camera sensor 12 cannot (fails to) recognize both the pair of white lines each of which defines each of the left and right sides of the lane on which the own vehicle is traveling, the camera sensor 12 cannot recognize the relative position of the own vehicle with respect to the lane in the lane width direction. When the camera sensor 12 recognizes the white line(s) unclearly (for example, when the white lines are faint (blur)), this state is treated as a state in which "the camera sensor 12 cannot (fails to) recognize the white line(s)." in this embodiment.

The LCA start conditions is not required to include the above-mentioned conditions, and can be set as appropriate.

When it is determined that the LCA start condition is not established, the driving support ECU 10 returns the processing to Step S11, and continues to execute the LTA.

When the LCA start condition is established while the LTA is being executed (Step S12: Yes), the driving support ECU 10 starts the LCA in Step S13. When the LCA is started, the driving support ECU 10 transmits an LCA execution display command to the meter ECU 30. As a result, LCA execution state is displayed on the display unit 31.

Figure 8:
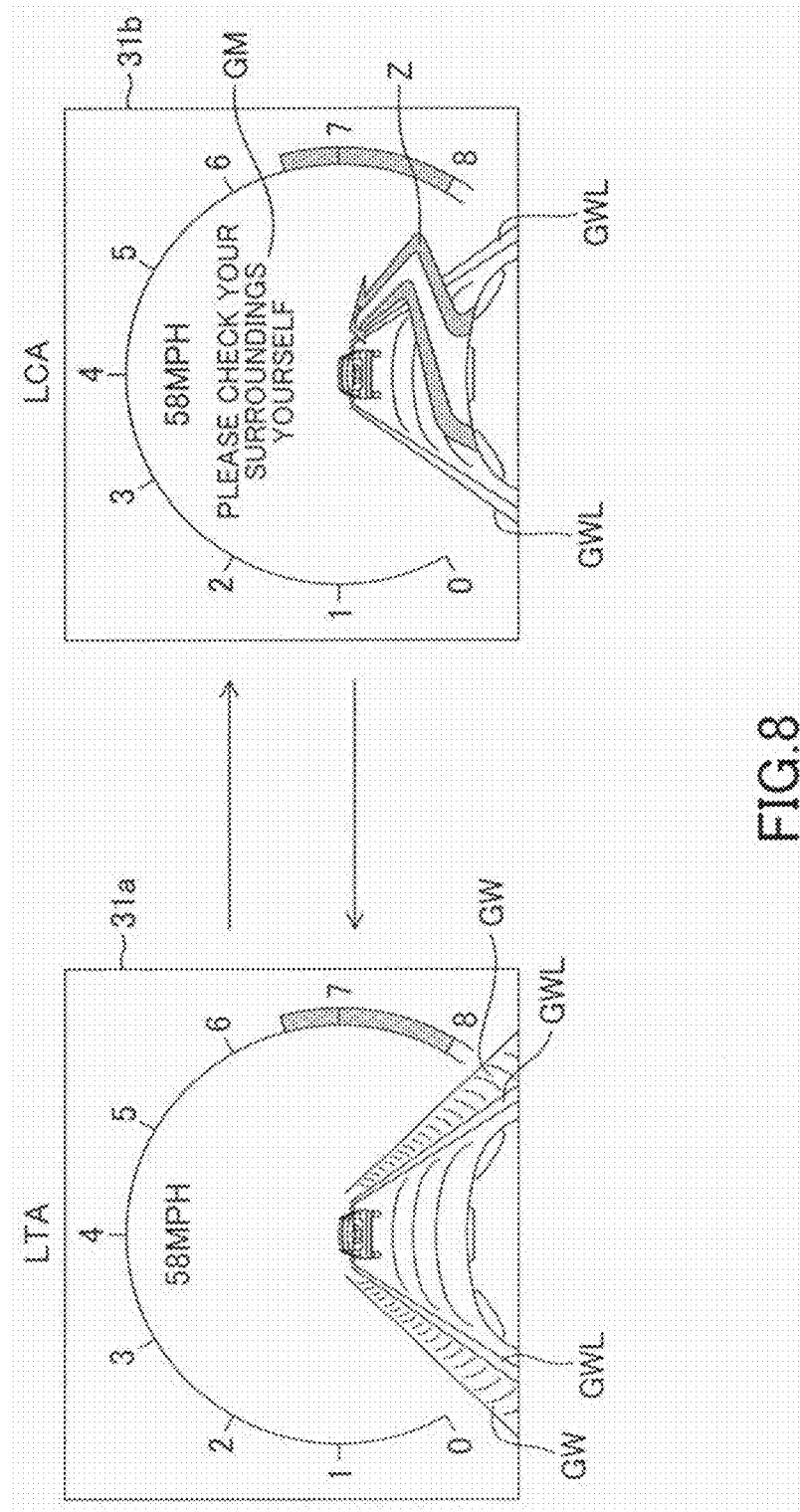
FIG. 8 is a diagram for illustrating an LTA screen and an LCA screen of a display unit.

FIG. 8 is a diagram for illustrating an example of a screen 31a (referred to as LTA screen 31a) displayed on the display unit 31 during execution of the LTA and a screen 31b (referred to as an LCA screen 31b) displayed during execution of the LCA. An image in which the own vehicle is traveling between the right and left white lines is displayed on the LTA screen 31a and on the LCA screen 31b. On the LTA screen 31a, virtual walls GW are displayed on an outer side of each of right and left white line displays GWL. The driver can recognize from those walls GW that the own vehicle is being controlled so as to travel within the lane.

On the other hand, on the LCA screen 31b, the display of the virtual walls GW is omitted, and in place of that display, an LCA trajectory Z is displayed. The driving support ECU 10 switches the screen to be displayed on the display unit 31 between the LTA screen 31a and the LCA screen 31b depending on the steering assist control state. As a result, the driver can easily discriminate whether or not the execution state of the steering assist control is the LTA or the LCA.

The LCA is only control for assisting the steering operation by the driver for changing lanes. The driver still has a duty to monitor his or her surroundings. Therefore, a message GM, namely, "Please check your surroundings yourself", for causing the driver to monitor his or her surroundings is displayed on the LCA screen 31b.

When the LCA starts, first, in Step S13 of the routine illustrated in FIG. 5, the driving support ECU 10 calculates the target trajectory. The LCA target trajectory is now described.

Figure 9:
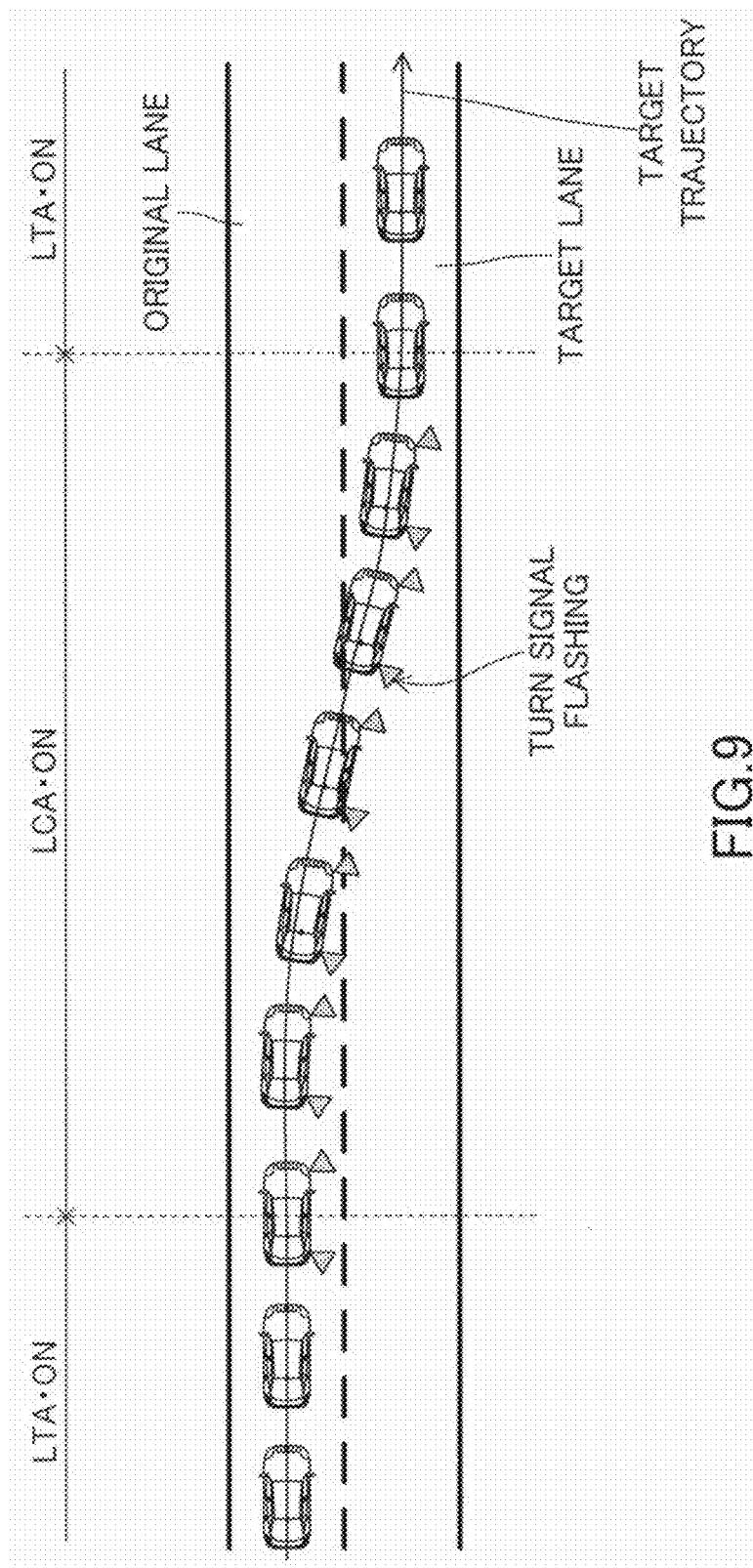
FIG. 9 is a diagram for illustrating a target trajectory of an own vehicle.

When executing the LCA, the driving support ECU 10 calculates a target trajectory function for deciding the target trajectory of the own vehicle. The target trajectory is a trajectory along which the own vehicle is moved for a target lane change time period from the lane (called "original lane") on which the own vehicle is currently traveling to the center position in the width direction (called "final target lateral position") of the lane (called "target lane") present in the lane change assist request direction, which is adjacent to the original lane. The target trajectory has, for example, a shape as illustrated in FIG. 9.

The target trajectory function is, as described later, a function for calculating a target value for the lateral position (target lateral position) of the own vehicle corresponding to an elapsed time t based on the lane center line CL of the original lane as a reference, and uses an elapsed time t from an LCA start time (point at which LCA start condition is established) as a variable. The lateral position of the own vehicle represents the center of gravity of the own vehicle in the lane width direction (also referred to as lateral direction) based on the lane center line CL as a reference.

The target lane change time is variably set in proportion to the distance (hereinafter referred to as "required lateral distance") that the own vehicle is to move in the lateral direction from an initial position, which is the LCA start position (lateral position of the own vehicle at the LCA start point) until a final target lateral position. For example, when the lane width is 3.5 m as in the case of general roads, the target lane change time period is set to, for example, 8.0 seconds. This example corresponds to a case in which the own vehicle is positioned on the lane center line CL of the original lane at the start of the LCA. The target lane change time is adjusted in proportion to the width of the lane. Therefore, the target lane change time is set to a larger value as the lane is wider, and conversely, to a smaller value as the lane is narrower.

Further, when the lateral-direction position of the own vehicle at the start of the LCA is shifted to the lane change side with respect to the lane center line CL of the original lane, the target lane change time period is set to be decreased as the shift amount (lateral difference Dy) is increased. On the other hand, when the lateral-direction position of the own vehicle at the start of the LCA is shifted to the opposite side of the lane change side with respect to the lane center line CL of the original lane, the target lane change time period is set to be increased as the shift amount (lateral difference Dy) is increased. For example, when the shift amount is 0.5 m, the increase/decrease adjustment amount of the target lane change time period may be 1.14 seconds (=8.0×0.5/3.5). The value for setting the target lane change time shown here is merely one example, and an arbitrarily set value can be used.

In this embodiment, a target lateral position y is calculated based on a target trajectory function y(t) represented by Expression (2). The lateral position function y(t) is a fifth-order function in which the elapsed time t is a variable.

$$y(t) = c_0 + c_1 \cdot t + c_2 \cdot t^2 + c_3 \cdot t^3 + c_4 \cdot t^4 + c_5 \cdot t^5 \qquad (2)$$

This target trajectory function y(t) is set to a function such that the own vehicle is smoothly moved to a final target lateral position.

In Expression (2), coefficients $c_0$, $c_1$, $c_2$, $c_3$, $c_4$, and $c_5$ are determined based on the state of the own vehicle when the LCA starts (initial lateral state amount) and a target state (final target lateral state amount) of the own vehicle when the LCA is complete.

Figure 10:
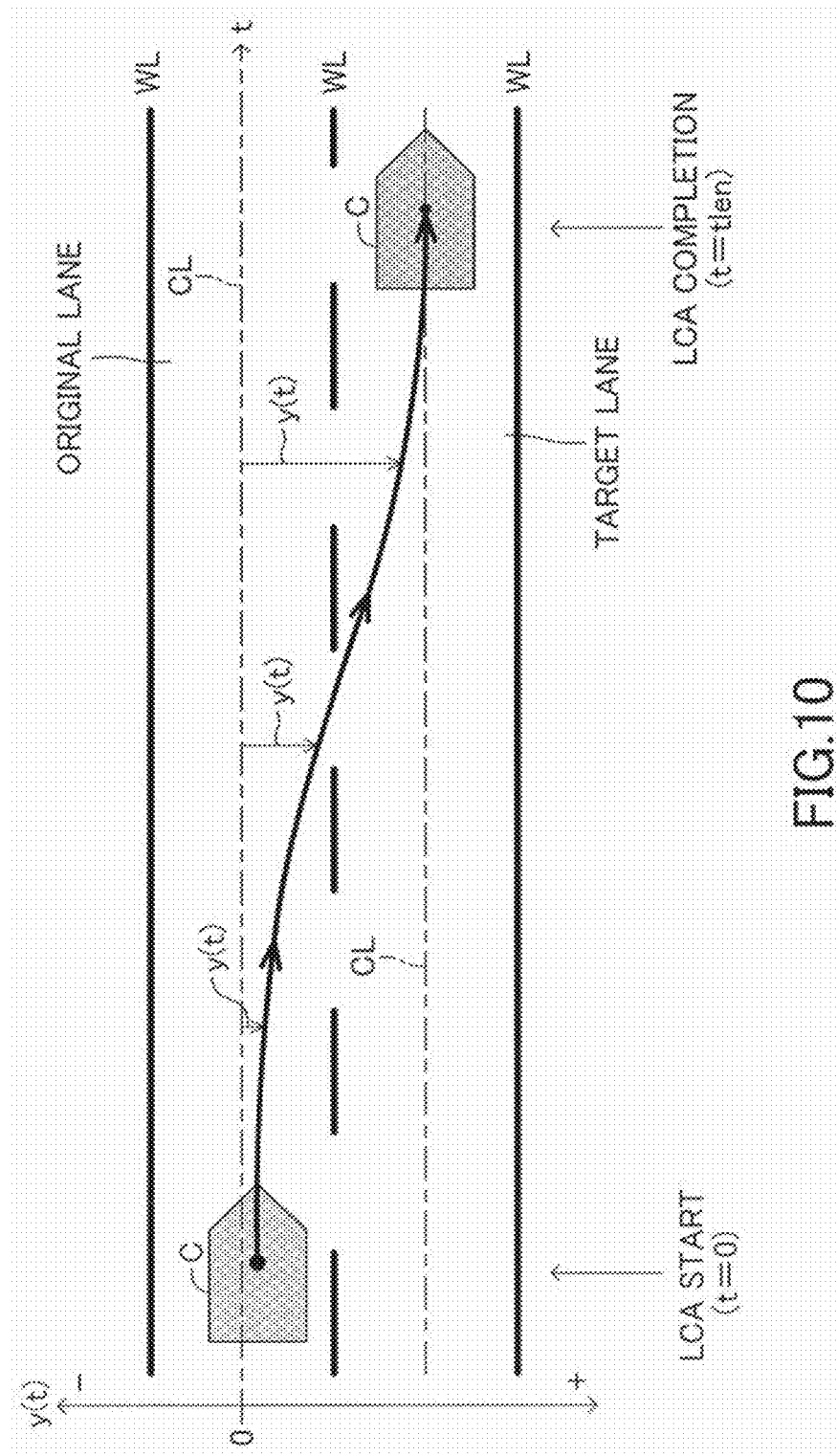
FIG. 10 is a diagram for illustrating a target trajectory function.

For example, as illustrated in FIG. 10, the target trajectory function y(t) is a function for calculating a target lateral position y(t) of an own vehicle C corresponding to an elapsed time t (also sometimes referred to as current time t) from the LCA start point (calculation point of the target trajectory), based on the lane center line CL of the lane (original lane) on which the own vehicle C is traveling at the current time point. In FIG. 10, the lane is formed in a straight line, but when the lane is formed in a curve, the target trajectory function y(t) is a function for calculating, based on the lane center line CL formed in a curve, the target lateral position of the own vehicle relative to the lane center line CL.

The driving support ECU 10 sets target trajectory calculation parameters in the following manner in order to determine the coefficients $c_0$, $c_1$, $c_2$, $c_3$, $c_4$, and $c_5$ of the target trajectory function y(t). The target trajectory calculation parameters include the following seven (P1 to P7) parameters.

P1. Lateral position of the own vehicle relative to the lane center line of the original lane when the LCA starts (referred to as initial lateral position).

P2. Speed of the own vehicle in the lateral direction when the LCA starts (referred to as initial lateral speed).

P3. Acceleration of the own vehicle in the lateral direction when the LCA starts (referred to as initial lateral acceleration).

P4. Target lateral position (referred to as final target lateral position) of the own vehicle relative to the lane center line of the original lane when the LCA is complete (referred to as LCA completion point).

P5. Target speed of the own vehicle in the lateral direction when the LCA is complete (referred to as final target lateral speed).

P6. Target acceleration of the own vehicle in the lateral direction when the LCA is complete (referred to as final target lateral acceleration).

P7. Target time, which is a target value of the time for executing the LCA (time from the start of the LCA until the LCA completion point) (referred to as target lane change time).

As described above, the lateral direction is the lane width direction. Therefore, the lateral speed represents the speed of the own vehicle in the width direction of the lane, and the lateral acceleration represents the acceleration of the own vehicle in the width direction of the lane.

The processing for setting those seven target trajectory calculation parameters is referred to as initialization processing. In this initialization processing, the target trajectory calculation parameters are set in the following manner. Specifically, the initial lateral position is set to a value equivalent to the lateral deviation Dy detected by the camera sensor 12 when the LCA starts. The initial lateral speed is set to a value (v·sin(θy)) obtained by multiplying the sine value sin(θy) of the yaw angle θy detected by the camera sensor 12 by a vehicle speed v detected by the vehicle speed sensor when the LCA starts. The initial lateral acceleration is set to a value (v·γ) obtained by multiplying the vehicle speed v by a yaw rate γ (rad/s) detected by the yaw rate sensor when the LCA starts. However, the initial lateral acceleration can also be set to a derivative value of the initial lateral speed. The initial lateral position, the initial lateral speed, and the initial lateral acceleration are collectively referred to as the initial lateral state amount.

The driving support ECU 10 in this embodiment considers the lane width of the target lane to be the same as the lane width of the original lane detected by the camera sensor 12. Therefore, the final target lateral position is set to the same value as the lane width of the original lane (final target lateral position=lane width of original lane). The driving support ECU 10 sets the value of the final target lateral speed and the value of the final target acceleration to zero. The final target lateral position, the final target lateral speed, and the final target lateral acceleration are collectively referred to as the final target lateral state amount.

The target lane change time is, as described above, calculated based on the lane width (the lane width of the original lane may be used) and the lateral-direction shift amount of the own vehicle when the LCA starts.

For example, a target lane change time teen is calculated by Expression (3).

$$t_{len} = D_{ini} A \tag{3}$$

In Expression (3), $D_{ini}$ is the required distance that the own vehicle is to be moved in the lateral direction from the LCA start position (initial lateral position) to an LCA completion position (final target lateral position). Therefore, when the own vehicle is positioned on the lane center line CL of the original lane at the start time of the LCA, $D_{ini}$ is set to a value equivalent to the lane width, and when the own vehicle is shifted from the lane center line CL of the original lane, $D_{ini}$ is a value obtained by adding or subtracting that shift amount to/from the lane width. Symbol A is a constant (referred to as a target time setting constant) representing the target time to be taken in order to move the own vehicle in the lateral direction by a unit distance. For example, symbol A is set to (8 sec/3.5 m=2.29 sec/m). In this example, when the required distance $D_{ini}$ that the own vehicle is to be moved in the lateral is 3.5 m, the target lane change time $t_{len}$ is set to 8 seconds.

The target time setting constant A is not limited to the above-mentioned value, and can be set arbitrarily. For example, the target time setting constant A may be selected from among a plurality of options in accordance with a preference of the driver by using the setting operation unit 14. The target lane change time can also be a fixed value.

The driving support ECU 10 calculates the coefficients $c_0$, $c_1$, $c_2$, $c_3$, $c_4$, and $c_5$ of the target trajectory function y(t) represented by Expression (2) based on the initial lateral state amount, the final target lateral state amount, and the target lane change time, all of which are determined by the initialization processing of the target trajectory calculation parameters, and confirms the target trajectory function y(t).

From the target trajectory function y(t) represented by Expression (2), a lateral speed y'(t) of the own vehicle can be represented by Expression (4), and a lateral acceleration y"(t) of the own vehicle can be represented by Expression (5).

$$y'(t) = c_1 + 2c_2 \cdot t + 3c_3 \cdot t^2 + 4c_4 \cdot t^3 + 5c_5 \cdot t^4 \tag{4}$$

$$y''(t) = 2c_2 + 6c_3 \cdot t + 12c_4 \cdot t^2 + 20c_5 \cdot t^3 \tag{5}$$

In Expressions (4) and (5), when the initial lateral position is represented as $y_0$, the initial lateral speed as $vy_0$, the initial lateral acceleration as $ay_0$, the final target lateral position as $y_1$, the final target lateral speed as $vy_1$, the final target lateral acceleration as $ay_1$, and the lane width of the original lane as W, based on the above-mentioned target trajectory calculation parameters, the following relational Expressions are obtained.

$$y(0) = c_0 = y_0 \tag{6}$$

$$y'(0) = c_1 = vy_0 \tag{7}$$

$$y''(0) = 2c_2 = ay_0 \tag{8}$$

$$y(t_{len}) = c_0 + c_1 \cdot t_{len} + c_2 \cdot t_{len}^2 + c_3 \cdot t_{len}^3 + c_4 \cdot t_{len}^4 + c_5 \cdot t_{len}^5 = y_1 = W \tag{9}$$

$$y'(t_{len}) = c_1 + 2c_2 \cdot t_{len} + 3c_3 \cdot t_{len}^2 + 4c_4 \cdot t_{len}^3 + 5c_5 \cdot t_{len}^4 vy_1 = 0 \tag{10}$$

$$y''(t_{len}) = 2c_2 + 6c_3 \cdot t_{len} + 12c_4 \cdot t_{len}^2 + 20c_5 \cdot t_{len}^3 = ay_1 = 0 \tag{11}$$

Therefore, the values of the coefficients $c_0$, $c_1$, $c_2$, $c_3$, $c_4$, and $c_5$ of the target trajectory function y(t) can be calculated from the six relational Expressions (6) to (11). The target trajectory function y(t) is calculated by substituting the values of the calculated coefficients $c_0$, $c_1$, $c_2$, $c_3$, $c_4$, and $c_5$ into Expression (2). The driving support ECU 10 stores and maintains the target trajectory function y(t) until the LCA is ended. At the same time as calculating the target trajectory function y(t), the driving support ECU 10 also activates a clock timer (initial value: zero), and starts to count up the elapsed time t from the start of the LCA.

When the target trajectory function has been calculated in this way, in the following Step S14, the driving support ECU 10 performs steering control based on the target trajectory function. This steering control is now specifically described.

First, the driving support ECU 10 calculates the target lateral state amount of the own vehicle at the current time point. The target lateral state amount includes the target lateral position, which is the target value for the lateral position of the own vehicle in the lane width direction, the target lateral speed, which is the target value for the speed (lateral speed) of the own vehicle in the lane width direction, and the target lateral acceleration, which is the target value for the acceleration (lateral acceleration) of the own vehicle in the lane width direction. The lateral speed and the lateral acceleration are collectively referred to as a lateral movement state amount, and the target lateral speed and the target lateral acceleration are sometimes collectively referred to as a target lateral movement state amount.

In this case, the driving support ECU 10 calculates, based on the target trajectory function y(t) confirmed in Step S13 and the current time t, the target lateral position, the target lateral speed, and the target lateral acceleration at the current time point. The current time t is the time that has elapsed since the target trajectory function y(t) is confirmed in Step S13, and is the same as the elapsed time from the start of the LCA. In Step S13, when the target trajectory function y(t) has been calculated, the driving support ECU 10 resets the clock timer and starts to count up the elapsed time t (=current time t) from the start of the LCA. The target lateral position is calculated by substituting the current time t into the target trajectory function y(t). The target lateral speed is calculated by substituting the current time t into a function y'(t) obtained by first-order differentiation of the target trajectory function y(t), and the target lateral acceleration is calculated by substituting the current time t into a function y"(t) obtained by second-order differentiation of the target trajectory function y(t). The driving support ECU 10 reads the elapsed time t measured by the timer, and based on this measured time t and the above-mentioned functions, calculates the target lateral state amount.

In the following description, the target lateral position at the current time is represented as y*, the target lateral speed at the current time is represented as vy*, and the target lateral acceleration at the current time is represented as ay*.

Next, the driving support ECU 10 calculates a target yaw state amount, which is a target value relating to movement for changing the direction of the own vehicle. The target yaw state amount represents, at the current time point, a target yaw angle θy* of the own vehicle, a target yaw rate γ* of the own vehicle, and a target curvature Cu*. The target curvature Cu* is the curvature of the trajectory for changing the lane of the own vehicle, namely, the curvature of the curve component relating to lane change that does not include the curvature of the curve of the lane.

The driving support ECU 10 reads the vehicle speed v at the current time point (current vehicle speed detected by the vehicle speed sensor), and based on this vehicle speed v, a target lateral speed vy*, and a target lateral acceleration ay*, calculates the target yaw angle θy*, the target yaw rate γ*, and the target curvature Cu* at the current time point by using following Expressions (12), (13), and (14).

$$\theta y^* = \sin^{-1}(vy^*/v) \quad (12)$$

$$\gamma^* = ay^*/v \quad (13)$$

$$Cu^* = ay^*/v^2 \quad (14)$$

Specifically, the target yaw angle θy* is calculated by substituting a value obtained by dividing the target lateral speed vy* by the vehicle speed v into an arcsine function. The target yaw rate γ* is calculated by dividing the target lateral acceleration ay* by the vehicle speed v. The target curvature Cu* is calculated by dividing the target lateral acceleration ay* by the square of the vehicle speed v.

Next, the driving support ECU 10 calculates the target control amount of the LCA. In this embodiment, a target steering angle $\theta_{lca}^*$ is calculated as the target control amount. The target steering angle $\theta_{lca}^*$ is calculated by Expression (15) based on the target lateral position y*, the target yaw angle θy*, the target yaw rate γ*, the target curvature Cu*, and the curvature Cu calculated in the manner described above.

$$\theta_{lca}^* = K_{lca}1 \cdot (Cu^* + Cu) + K_{lca}2 \cdot (\theta y^* - \theta y) + K_{lca}3 \cdot (y^* - y) + K_{lca}4 \cdot (\gamma^* - \gamma) + K_{lca}5 \cdot \Sigma(y^* - y) \quad (15)$$

In Expression (15), $K_{lca}1$, $K_{lca}2$, $K_{lca}3$, $K_{lca}4$, and $K_{lca}5$ each represent a control gain. The symbol Cu represents the curvature at the current time point (during calculation) detected by the camera sensor 12. The symbol y represents the lateral position at the current time point (during calculation) detected by the camera sensor 12, namely, y corresponds to Dy. The symbol θy represents the yaw angle at the current time point (during calculation) detected by the camera sensor 12. The symbol γ represents the yaw rate of the own vehicle at the current time point detected by the yaw rate sensor. The derivative value of the yaw angle θy can also be used as γ.

The first term on the right-hand side is a feed-forward control amount determined in accordance with a value obtained by adding the target curvature Cu* and the curvature Cu (curve of the lane). $K_{lca}1 \cdot Cu^*$ is the feed-forward control amount for performing lane change. $K_{lca}1 \cdot Cu$ is the feed-forward control amount for causing the own vehicle to travel along the curve of the lane. Therefore, the control amount represented by the first term on the right-hand side is basically set to a value capable of causing the own vehicle to travel along a target travel path when the steering angle is controlled by that control amount. In this case, the control gain $K_{lca}1$ is set to a value that depends on the vehicle speed v. For example, the control gain $K_{lca}1$ may be set like in Expression (16) in accordance with a wheel base L and a stability factor Ksf (fixed value determined for each vehicle). In this case, K is a fixed control gain.

$$K_{lca}1 = K \cdot L \cdot (1 + Ksf \cdot v^2) \quad (16)$$

The second to fifth terms on the right-hand side in Expression (15) each represent a feedback control amount. The second term on the right-hand side represents a steering angle component for providing feedback so as to reduce a deviation between the target yaw angle θy* and an actual yaw angle θy. The third term on the right-hand side represents a steering angle component for providing feedback so as to reduce a deviation between the target lateral position y* and an actual lateral position y. The fourth term on the right-hand side represents a steering angle component for providing feedback so as to reduce a deviation between the target yaw rate γ* and an actual yaw rate γ. The fifth term on the right-hand side represents a steering angle component for providing feedback so as to reduce an integral value Σ(y*−Y) of a deviation between the target lateral position y* and the actual lateral position y.

The target steering angle $\theta_{lca}^*$ is not limited to an angle calculated based on the above-mentioned five steering components. The target steering angle $\theta_{lca}^*$ can be calculated using only arbitrary steering components from among those five, or can also be calculated by, for example, additionally using other steering components. For example, regarding the feedback control amount relating to yaw movement, any one of a deviation in the yaw angle and a deviation in the yaw rate can be used. Further, the feedback control amount obtained using the integral value Σ(y*−Y) of the deviation between the target lateral position y* and the actual lateral position y can be omitted.

When the target control amount has been calculated, the driving support ECU 10 transmits the steering command representing the target control amount to the EPS•ECU 20. In this embodiment, the driving support ECU 10 calculates the target steering angle $\theta_{lca}^*$ as the target control amount, but the driving support ECU 10 may calculate a target torque for obtaining the target steering angle $\theta_{lca}^*$, and transmit a steering command representing that target torque to the EPS•ECU 20.

The processing described above is the processing of Step S14.

When receiving a steering command from the driving support ECU 10 via the CAN 100, the EPS•ECU 20 controls the drive of the steering motor 22 so that the steering angle follows the target steering angle $\theta_{lca}^*$.

Next, in Step S15, the driving support ECU 10 determines whether or not a predetermined LCA interruption condition is established.

The LCA interruption condition is established when any one of the following first interruption condition to third interruption condition is established. First interruption condition: The estimated time period (a collision time TTC) from the current time until the own vehicle collides with another vehicle is less than the threshold TTCth when the LCA is executed.

Second interruption condition: The camera sensor 12 cannot (fails to) recognize the relative position of the own vehicle in the lane width direction with respect to the lane.

Third interruption condition: The steering torque which is input to the steering wheel and is detected by the steering torque sensor exceeds a predetermined value.

The driving support ECU 10 determines whether or not the first interruption condition is established in Step S15. That is, the driving support ECU10 calculates the estimated time period (the collision time TTC: Time to collision) from the current time until the own vehicle collides with another vehicle(s) based on the relative speed with respect to the "another vehicle(s) existing on the original lane and/or the target lane adjacent to the original lane" and the distance between the own vehicle and another vehicle(s). Then, the driving support ECU 10 determines whether or not the collision time TTC is equal to or more than a threshold TTCth. When the collision time TTC is equal to or more than the threshold TTCth, the first interruption condition is not established. On the other hand, when the collision time TTC is less than the threshold TTCth, the first interruption condition is established. Further, the driving support ECU 10 outputs the surrounding monitoring result. When the collision time TTC is equal to or more than the threshold TTCth, the surrounding monitoring result is "there is no approaching vehicle". When the collision time TTC is less than the threshold TTCth, the surrounding monitoring result is "there is an approaching vehicle".

Furthermore, the driving support ECU 10 determines whether or not the second interruption condition is established in Step S15. That is, the driving support ECU 10 determines whether or not the camera sensor 12 can recognize the relative position of the own vehicle in the lane width direction with respect to the lane at the current time. For example, when the camera sensor 12 simultaneously can recognize a pair of white lines WL defining left and right side edge portions of the lane on which the own vehicle is traveling respectively, the second interruption condition is not established. On the other hand, when the camera sensor 12 simultaneously cannot (fails to) recognize the pair of white lines WL defining the left and right side edge portions of the lane on which the own vehicle is traveling respectively, the second interruption condition is established.

Further, in Step S15, the driving support ECU 10 determines whether or not the third interruption condition is established. That is, the driving support ECU 10 determines whether or not the steering torque of the steering wheel which is detected by the steering torque sensor exceeds the predetermined value at the current time. When the steering torque of the steering wheel does not exceed the predetermined value, the third interruption condition is not established. On the other hand, when the steering torque of the steering wheel exceeds the predetermined value, the third interruption condition is established.

When determining No in Step S15, the driving support ECU 10 proceeds to Step S16 to determine whether or not an LCA completion condition is established. In this embodiment, the LCA completion condition is established when the lateral position y of the own vehicle has reached the final target lateral position y*. When the LCA completion condition is not established, the driving support ECU 10 returns the processing to Step S14, and repeats the processing of Steps S14 to S16 at a predetermined calculation cycle. In this way, the LCA is continued.

During execution of the LCA, target lateral state amounts (y*, vy*, and ay*) that depend on the elapsed time t are calculated. In addition, based on the calculated target lateral state amounts (y*, vy*, and ay*) and the vehicle speed v, target yaw state amounts (θy*, γ*, and Cu*) are calculated, and based on the calculated target yaw state amounts (θy*, γ*, and Cu*), the target control amount ($\theta_{lca}$*) is calculated. Each time the target control amount ($\theta_{lca}$*) is calculated, a steering command representing the target control amount ($\theta_{lca}$*) is transmitted to the EPS•ECU 20. In this way, the own vehicle travels along the target trajectory.

When the travel position of the own vehicle switches during execution of the LCA from the original lane to the target lane, the lane-related vehicle information (Cu, Dy, and θy) supplied to the driving support ECU 10 from the camera sensor 12 switches from lane-related vehicle information on the original lane to lane-related vehicle information on the target lane. As a result, it is not possible to use the target trajectory function y(t) initially calculated when the LCA started as is. When the lane on which the own vehicle is positioned switches, the sign of the lateral deviation Dy reverses. Therefore, when the driving support ECU 10 detects that the sign (plus or minus) of the lateral deviation Dy output by the camera sensor 12 has switched, the driving support ECU 10 offsets the target trajectory function y(t) by the lane width W of the original lane. This enables the target trajectory function y(t) calculated using the lane center line CL of the original lane as an origin to be converted into a target trajectory function y(t) in which the lane center line CL of the target lane is the origin.

When it is determined in Step S16 that the LCA completion condition is established, in Step S17, the driving support ECU 10 sets the steering assist control state to an LTA ON state, that is, completes the LCA and restarts the LTA. As a result, steering is controlled so that the own vehicle travels along the lane center line CL of the target lane. When the steering assist control state is set to an LTA ON state in Step S17, the driving support ECU 10 returns the processing to Step S11, and continues the steering assist control routine described above as is.

When the LCA is complete and the steering assist control state is set to an LTA ON state, the screen displayed on the display unit 31 is switched to the LTA screen 31*a* from the LCA screen 31*b*, as illustrated in FIG. 8.

During the period from the start of the LCA until the end of the steering assist control routine, the driving support ECU 10 transmits to the meter ECU 30 a flashing command of the turn signal 32 corresponding to the turn signal operation direction. From before the LCA is started, the turn signal 32 flashes based on a flashing command transmitted from the steering ECU 40 due to an operation of the turn signal lever 41 to the first stroke position P1L (P1R). The meter ECU 30 continues the flashing of the turn signal 32 during the period that the flashing command is transmitted from the driving support ECU 10, even when the flashing command transmitted from the steering ECU 40 is stopped.

Figure 6:
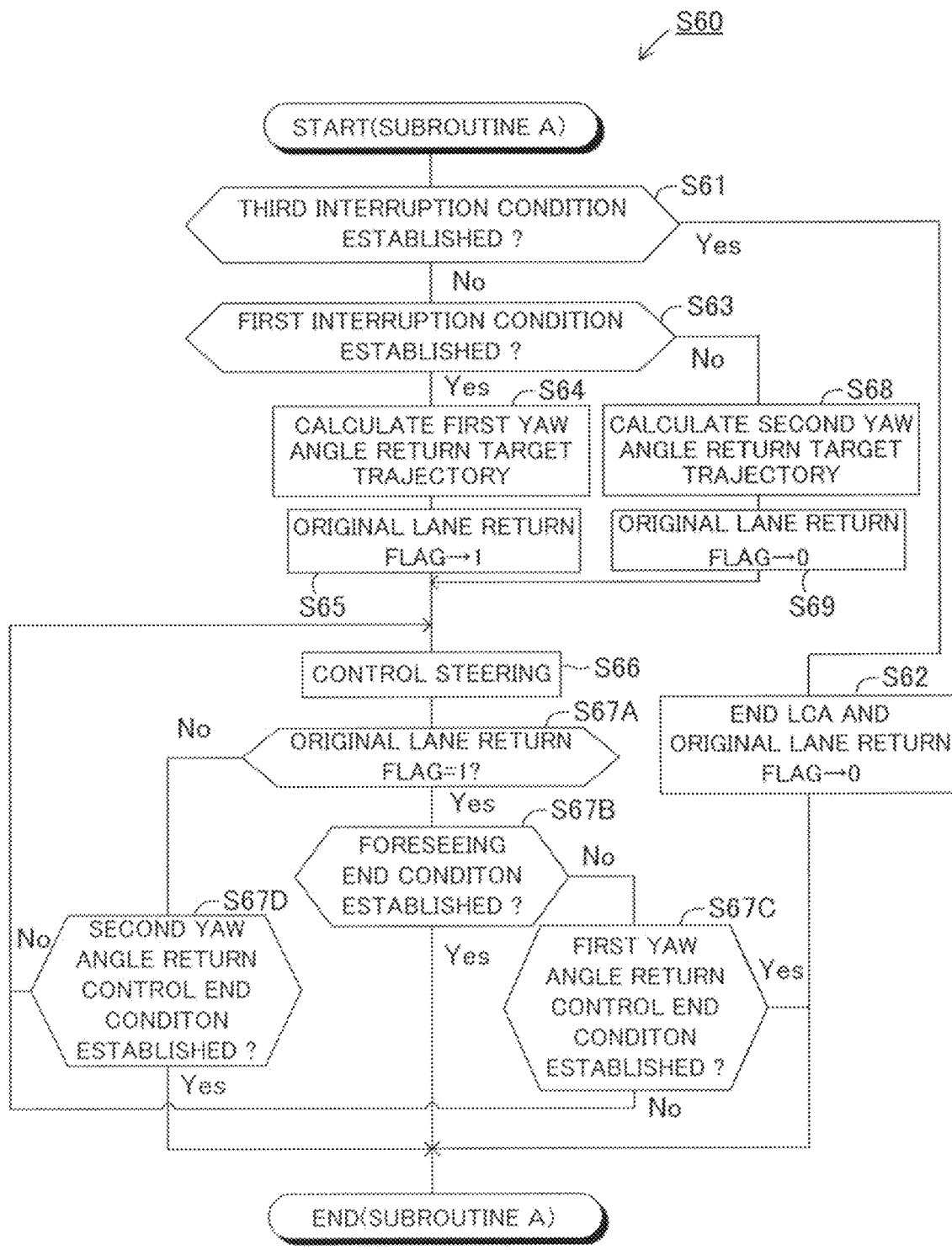
FIG. 6 is a flowchart for illustrating a subroutine A.

Next, a case where the driving support ECU 10 determines Yes in Step S15 will be described. In this case, the driving support ECU 10 advances the processing to Step S60. FIG. 6 is a flowchart showing the processing of Step S60 (subroutine A).

First, in Step S61, the driving support ECU 10 determines whether or not the third interruption condition is established.

When determining Yes in Step S61, the drive support ECU 10 proceeds to Step S62.

In this case, since the driver is considered to wish to steer the steering wheel by himself/herself and interrupt the LCA, the driving support ECU 10 immediately terminates the LCA.

Further, the driving support ECU 10 sets an original lane return flag to "0". The initial value of the original lane return flag is "0".

Upon completion of the processing of Step S62, the driving support ECU 10 temporarily ends the processing of the subroutine A.

On the other hand, when determining No in Step S61, the driving support ECU 10 proceeds to Step S63.

Figure 13:
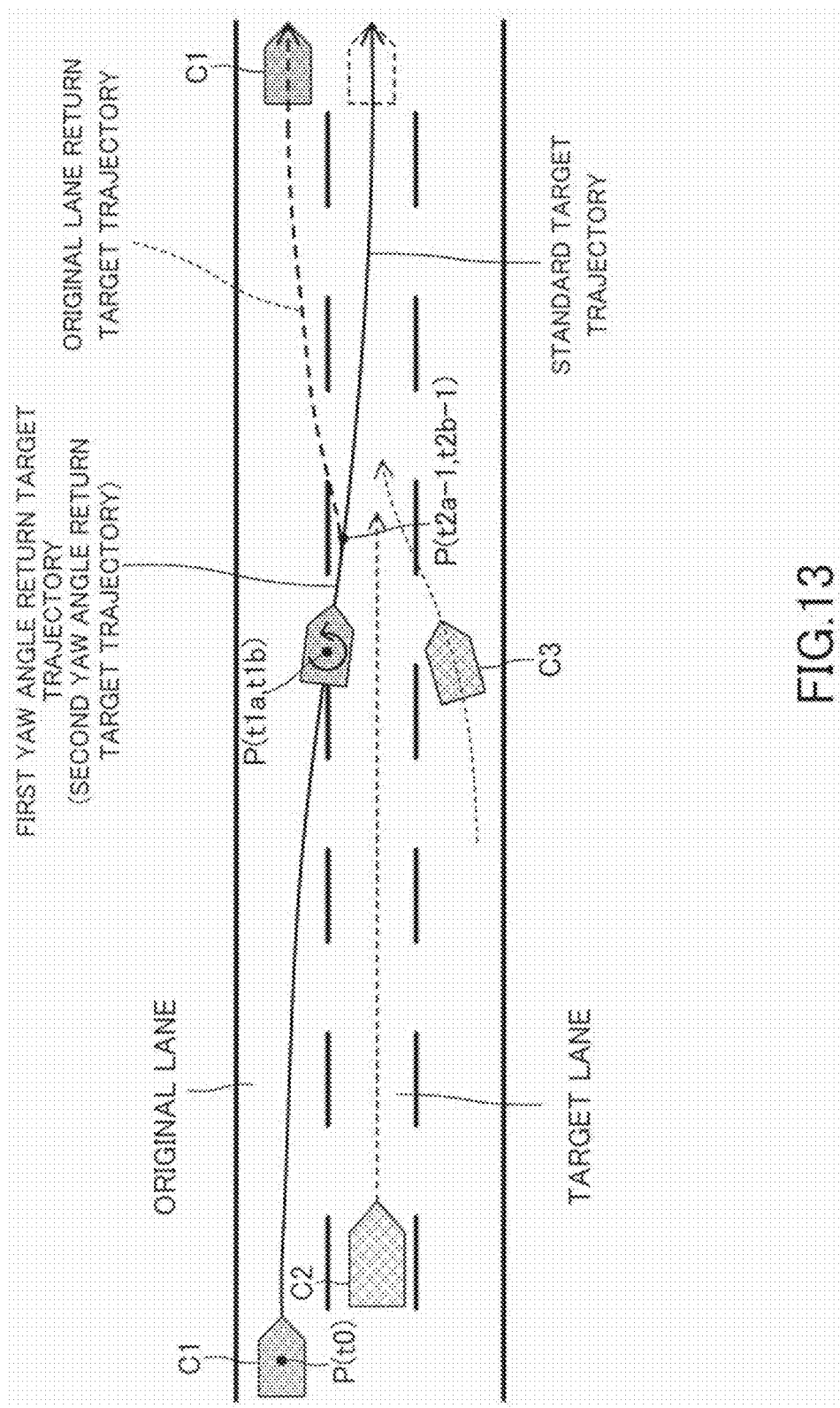
FIG. 13 is a diagram for illustrating the target trajectory and an original lane return trajectory.

During the execution of the LCA, as shown in FIG. 13, there is a case where another vehicle C2, which is traveling on the target lane and is positioned behind the own vehicle C1, rapidly approaches the own vehicle C1 at an unexpected relative speed. Further, there is a case where another vehicle C3, which traveled on a lane adjacent to the target lane (a lane separated from the original lane by two lanes) enters the target lane and abnormally approaches the own vehicle C1. Further, there is a case where another vehicle, which was positioned in the blind spot range of the surrounding sensors 11, abnormally approaches the own vehicle.

In this way, for example, when the collision time TTC becomes less than the threshold TTCth in the case where another vehicle C3 is abnormally approaching, the driving support ECU 10 determines Yes in Step S63 to proceed to Step S64. Then, in Step S64, the driving support ECU 10 executes processing for supporting avoidance of collision with another vehicle by issuing an alarm to the driver and changing the movement of the own vehicle in a short time so that the own vehicle does not move to the center of the target lane in the width direction.

In Step S64, the driving support ECU 10 sets the steering assist control state to a first yaw angle return control state. When the steering assist control state is set to the first yaw angle return control state, the LCA is terminated.

Further, in Step S64, the driving support ECU 10 calculates a first yaw angle return target trajectory (see FIG. 13) for returning the yaw angle of the own vehicle to a state (the yaw angle) immediately before the start of the LCA.

Here, the first yaw angle return target trajectory is described. The first yaw angle return target trajectory is a target trajectory for making the yaw angle of the own vehicle zero as brief a period as possible so as not to cause a problem on running stability of the vehicle. In other words, the first yaw angle return target trajectory is a target trajectory for making the lateral speed of the own vehicle in the lane change direction zero as brief a period as possible so as not to cause a problem on running stability of the vehicle. Immediately before the start of the LCA, the LTA is being executed. Therefore, when the LCA is started, the yaw angle is estimated to be a value close to zero. Therefore, the driving support ECU 10 calculates the first yaw angle return target trajectory for returning the yaw angle generated in the LCA to the state (the yaw angle) at the lane change start time, which is the start time of the LCA, to cancel the target lateral speed vy* calculated from the target trajectory function of the LCA (to make the target lateral speed vy* zero).

This target trajectory during the LCA represents the target lateral position versus (corresponding to) the elapsed time from the lane change start time. However, the first yaw angle return target trajectory is defined by the target curvature versus (corresponding to) the elapsed time from the point when an approaching vehicle is detected. The target control amount to be finally output to the EPS•ECU 20 is set to a value obtained by multiplying a control gain (a coefficient for converting curvature into a steering angle, which can be the above-mentioned control gain $K_{lca}1$) by a value obtained by adding together this target curvature and the curvature (curvature of the curve of the lane) detected by the camera sensor 12.

A method of returning the yaw angle to the state at the lane change start time t0 along the first yaw angle return target trajectory referring to FIG. 11. The target control amount during the LCA is represented by the target steering angle θlca*. This target steering angle θlca* includes, as shown by Expression (15), a feed-forward term (Klca1·Cu*) calculated from the target curvature Cu*.

The change in the target curvature corresponds to a change in the steering angle, and can be grasped as a change in the yaw angle. Therefore, when an approaching vehicle is detected, the yaw angle can be returned to the state at the lane change start time t0 by calculating the integral value of the target curvature Cu* during the time period from the lane change start time t0 being the start time of the LCA until the approaching vehicle is detected, reversing the sign of the control amount corresponding to the integral value of the target curvature Cu*, and outputting the control amount to the EPS•ECU 20.

Figure 11:
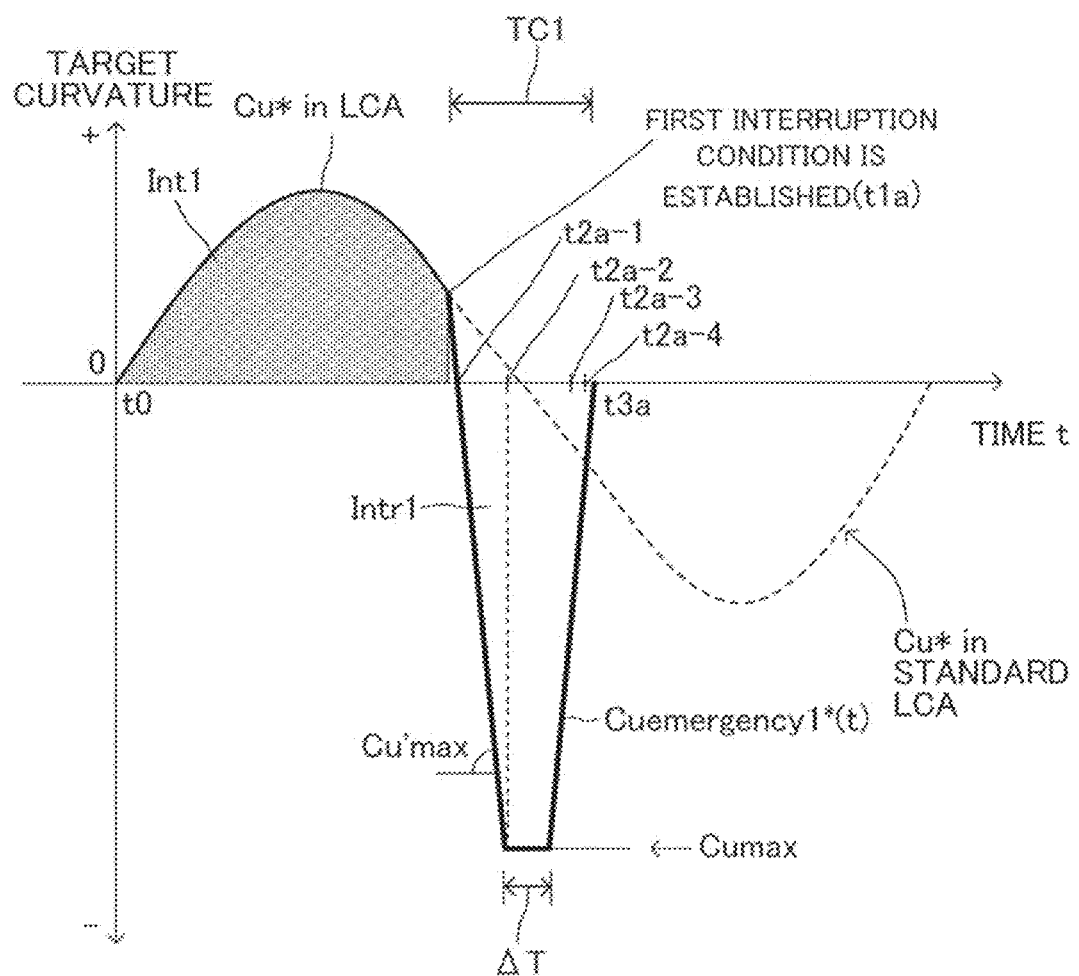
FIG. 11 is a graph for showing a target curvature when a first yaw angle return control is executed.

For example, a graph of FIG. 11 shows the case where an approaching vehicle is detected at a time t1a. In other words, the graph of FIG. 11 shows the case where the first interruption condition is established at the time t1a. When the approaching vehicle is detected at the time t1a, the integral value of the target curvature Cu* from the lane change start time t0 at which the LCA starts to the time t1a corresponds to the surface area of the portion colored in gray in FIG. 11. Therefore, when the sign of the feed-forward control amount corresponding to that surface area is reversed (the left-right direction is reversed) and the feed-forward control amount is issued as a command to the EPS•ECU 20, the yaw angle can be returned to the state at the lane change start time t0 at the point when output of the feed-forward control amount is complete. The value obtained by reversing the sign (plus or minus) of a first integral value Int1, which is the integral value of the target curvature Cu* from the lane change start time t0 to the time t1a, is referred to as a first inverse integral value Intr1. This first inverse integral value Intr1 corresponds to the surface area of a trapezoidal portion formed under the abscissa axis (time axis) between a time t2a-1 and a time t3a in FIG. 11. The value obtained by adding this first inverse integral value Intr1 to the first integral value Int1 of the target curvature Cu* from the lane change start time t0 to the time t1a is zero.

When the approaching vehicle (another vehicle may abnormally approach the own vehicle on the target lane) is detected at the time t1a, as shown in FIG. 13, a part of the own vehicle is entering the target lane or the distance from the own vehicle to the target lane is short. Thus, this state is an emergency state. Therefore, the own vehicle is required to be made to be parallel to the formation direction of the lane by returning the yaw angle to zero as brief a period as possible. Meanwhile, in the control system of the steering assist device, the upper limit of the magnitude of the vehicle's lateral acceleration (lateral acceleration which acts on the vehicle and is different from lateral acceleration in the lane width direction) and the upper limit of the magnitude of change rate which is allowed to be used for changing the lateral acceleration (the magnitude of change amount of the lateral acceleration per unit time) are set in advance.

Accordingly, as shown in the heavy line of FIG. 11, the driving support ECU 10 calculates a first target curvature Cuemergency 1* which is the target curvature at or after the time t1a. This first target curvature Cuemergency 1* is defined by the outline (visible outline) of the first integral value Int1 (the trapezoidal shape) between the time t2a-1 and the time t3a in FIG. 11. The first target curvature Cuemergency 1* is calculated by using the maximum value (Cumax) and the maximum change in gradient (Cu'max). The maximum value (Cumax) is set to the upper limit of the lateral acceleration of the vehicle which is allowed in the control system of the steering assist device. The maximum change in gradient (Cu'max) represents a change in gradient to increase the first target curvature Cuemergency 1* to the maximum value (Cumax) and a change in gradient to decrease the first target curvature Cuemergency 1* to zero from the maximum value Cumax, and is set as the upper limit which is allowed in the control system of the steering assist device. For example, the maximum value Cumax is set to a value so that the lateral acceleration of the vehicle becomes 0.2 G (G: gravitational acceleration). A lateral acceleration YG acting on the vehicle can be calculated by multiplying the square of the vehicle speed ($v^2$) by a curvature (Cu) (YG=$v^2$·Cu). Therefore, based on this relational expression, the maximum value Cumax can be calculated. Noted that the sign of the maximum value Cumax and the sign of the maximum change in gradient Cu'max are determined by the sign of the first inverse integral value Intr1.

The driving support ECU 10 calculates the first target curvature Cuemergency 1* versus (corresponding to) the elapsed time t from the time point (a time 1$a$ in FIG. 11) at which an approaching vehicle is detected based on the value of the first inverse integral value Intr1, the maximum value Cumax of the target curvature, and the maximum change in gradient Cu'max of the target curvature. In other words, the driving support ECU 10 calculates the elapsed time (the upper base of the trapezoidal shape) from a time t2$a$-1 to a time t3$a$ and time ΔT (the lower base of the trapezoidal shape) in which the maximum value Cumax is maintained based on the maximum value Cumax and the maximum change in gradient Cu'max to determine the outer shape of the first inverse integral value Intr1. Further, the driving support ECU 10 calculates the first target curvature Cuemergency 1* between the time t1$a$ and the time t2$a$-1 by extending the inclined straight line which is the outer shape of the first inverse integral value Intr1 between a time t2$a$-2, at which the first target curvature Cuemergency 1* becomes the maximum value (Cumax), and the time t2$a$-1. Hereinafter, the first target curvature Cuemergency 1* versus (corresponding to) the elapsed time t may be referred to as a first target curvature function Cuemergency 1*(t). The first target curvature function Cuemergency 1*(t) determines the target trajectory of the own vehicle. Therefore, the first target curvature function Cuemergency 1*(t) corresponds to the first yaw angle return target trajectory.

The first target curvature Cuemergency 1* at a predetermined time and the target steering angle θlca* at this predetermined time correspond to each other. Furthermore, the change in gradient of the first target curvature Cuemergency 1* at this predetermined time and the steering angular velocity (that is, the target steering angular velocity) which is the change amount of the steering angle per unit time at this predetermined time correspond to each other. Therefore, the maximum value Cumax determines the maximum value of the target steering angle θlca* between the time t1$a$ and the time t3$a$, and the maximum change in gradient Cu'max determines the maximum value of the target steering angular velocity between the time t1$a$ and the time t3$a$.

The first inverse integral value Intr1 can be calculated by integrating (adding up) target curvatures Cu* every time a target curvature Cu* is calculated during execution of the LCA and reversing the sign of the integral value. However, in this embodiment, the first inverse integral value Intr1 is calculated as follows.

The target curvature Cu* during the LCA can be represented like in Expression (19) by using the target lateral acceleration ay* and the vehicle speed v.

$$Cu^* = ay^*/v^2 \qquad (19)$$

Therefore, the value obtained by integrating this target curvature Cu* from the lane change start time t0 (elapsed time t=0) to the time t1$a$ (elapsed time t=t1$a$) can be represented like in Expression (20) by using the vehicle speed v and the target lateral speed vy*. Expression (20) is based on the assumption that the vehicle speed v can be assumed to be fixed during execution of the LCA.

$$\int_0^{t1} Cu^*(t)dt = \left[\frac{vy^*(t)}{v^2}\right]_0^{t1} \qquad (20)$$
$$= \frac{vy^*(t1)}{v^2}$$

Therefore, the first inverse integral value Intr1 is calculated by reversing the sign of the integral value obtained by Expression (20). As described above, when the first inverse integral value Intr1 is calculated, the first target curvature Cuemergency 1* versus (corresponding to) the elapsed time t from the point at which the approaching vehicle is detected can be calculated based on the magnitude of the first inverse integral value Intr1, the maximum value Cumax of the target curvature, and the maximum change in gradient Cu'max of the target curvature. In this way, under the restriction of the maximum value Cumax and the maximum change in gradient Cu'max, the driving support ECU 10 calculates the first target curvature Cuemergency 1* for returning the first integral value Int1, which is the integral value of the target curvature Cu* from the lane change start time t0 to the time t1$a$, to zero in the shortest time.

The above is the description of calculation of the first yaw angle return target trajectory (the first target curvature Cuemergency 1*).

In Step S64 of FIG. 6, the diving support ECU 10 sends an alarm to the driver to inform him/her that the LCA is halfway ended and that an approaching vehicle is detected at the same time as the calculation of the first yaw angle return target trajectory. For example, the driving support ECU 10 drives the buzzer 13 to generate an alarm sound (for example, a "beeping" sound), and transmits an LCA approach warning command to the meter ECU 30. This alarm sound is issued in the highest attention call level mode.

Figure 12:
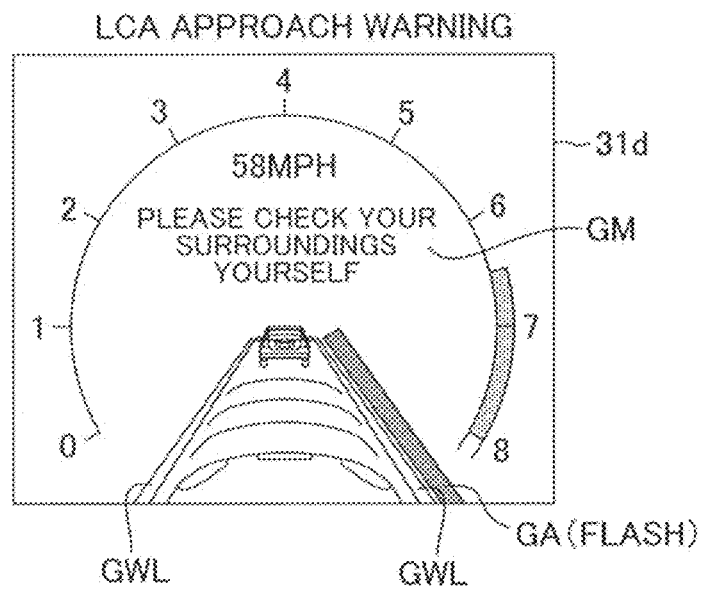
FIG. 12 is a diagram for illustrating the screen of the display unit when the first yaw angle return control is executed.

Upon receiving the LCA approach warning command, the meter ECU 30 displays an LCA approach warning screen 31$d$ on the display unit 31 as shown in FIG. 12. On the LCA approach warning screen 31$d$, the trajectory Z (see FIG. 8), which had been displayed on the display unit 31 until just before, is not displayed, and a blinking alarm mark GA is displayed so as to be parallel and adjacent to the white line display GWL which is positioned on lane change direction side (the right side in this example). The driver can recognize that the LCA is halfway terminated and another vehicle is abnormally approaching the own vehicle on the target lane by the sounding of the buzzer 13 and the LCA approach warning screen 31$d$ displayed on the display unit 31. In this case, an alarm message may be generated by voice announcement. A vibrator (not shown) may be vibrated to issue an alarm to the driver. The LCA approach warning screen 31$d$ continues to be displayed until a predetermined condition is established.

Upon completion of the processing of Step S64, the driving support ECU 10 proceeds to Step S65 to set the original lane return flag to "1".

Next, in Step S66 of the routine illustrated in FIG. 6, the driving support ECU 10 performs steering control based on the first target curvature function Cuemergency 1*(t) calculated in the previous Step S64. In this case, the driving support ECU 10 resets a clock timer t (the clock timer t starts after being cleared to zero), and calculates the first target curvature Cuemergency 1* at the current time point based on the elapsed time t from the time t1a at which the approaching vehicle is detected and the first target curvature function Cuemergency 1*(t). The driving support ECU 10 calculates a target steering angel θemergency* at the current time point based on the first target curvature Cuemergency 1* and the curvature Cu which is being detected by the camera sensor 12 at the current time point. This target steering angel θemergency* is referred to as first target control amount. The target steering angel θemergency* is, as shown in Expression (21), calculated by multiplying the control gain $K_{lca}1$ by a value obtained by adding the first target curvature Cuemergency 1* at the current time point and the curvature Cu which is being detected by the camera sensor 12.

$$\theta\text{emergency}^* = K_{lca}1 \cdot (Cu\text{emergency } 1^* + Cu) \quad (21)$$

The driving support ECU 10 transmits a steering command representing the target steering angel θemergency* to the EPS•ECU 20 each time the target steering angel θemergency* is calculated. When the EPS•ECU 20 receives the steering command, the EPS•ECU 20 controls the drive of the steering motor 22 so that the steering angle follows the target steering angel θemergency*. In this embodiment, the driving support ECU 10 calculates the target steering angel θemergency* as the target control amount, but the driving support ECU 10 may calculate a target torque for obtaining the target steering angel θemergency*, and transmit a steering command representing that target torque to the EPS•ECU 20.

In the following description, steering control using the target steering angel θemergency* based on the first target curvature Cuemergency 1* is referred to as first yaw angle return control. In the first yaw angle return control, the steering angle is controlled based only on feed-forward control term using the value obtained by adding the first target curvature Cuemergency 1* and the curvature Cu detected by the camera sensor 12. More specifically, feedback control using the yaw angle θy detected by the camera sensor 12 is not performed. Noted that, also in second yaw angle return control described later, feedback control using the yaw angle θy detected by the camera sensor 12 is not performed.

The driving support ECU 10 may also store the values of the feedback control amounts (the second to fifth terms on the right-hand side of Expression (15)) calculated immediately before the point (time t1a) at which the approaching vehicle is detected, and during the first yaw angle return control, may add those stored values (fixed values) to the right-hand side of Expression (21) as a part of the feed-forward control amounts.

Next, in Step S67A, the diving support ECU 10 determines whether or not the original lane return flag is "1".

In this case, the original lane return flag is "1", and thus the driving support ECU 10 proceeds to Step S67B.

Next, in Step S67B, the driving support ECU 10 determines whether or not a foreseeing end condition of the first yaw angle return control is established.

That is, the driving support ECU 10 calculates an estimated yaw angle change amount by multiplying a predetermined time period for foreseeing set in advance by a yaw rate detected by the yaw rate sensor, which is one of the vehicle state sensors 80, at the current time. The predetermined time period for foreseeing is set to be substantially the same as the total time which is calculated by adding a yaw angle detection processing time period of the camera sensor 12 and an actuator delay time of the steering motor 22, and is recorded in the ROM. Here, the yaw angle detection processing time period is a time period required from when the camera sensor 12 recognizes a white line (an object) until when the camera sensor 12 detects (calculates) the yaw angle of the own vehicle. On the other hand, the actuator delay time is a time period required from when the driving support ECU 10 issues an instruction to the EPS•ECU 20 until when the steeling motor 22 starts. In general, this actuator delay time tends to be much shorter than the yaw angle detection processing time period.

The estimated yaw angle change amount is an estimated amount of change amount of the yaw angle during the predetermined time period for foreseeing. The processing speed of the yaw rate sensor is much faster than the processing speed of the camera sensor 12. In other words, the yaw rate value detected by the yaw rate sensor at a given time is substantially the same as the actual yaw rate value at that time (the given time). Therefore, the estimated yaw angle change amount obtained by multiplying the predetermined time period for foreseeing by the yaw rate detected by the yaw rate sensor at the current time is highly likely to be a value extremely close to the actual change amount of the yaw angle during a time period from the current time until the predetermined time period for foreseeing passes.

Further, in Step S67B, the driving support ECU 10 determines whether or not the value obtained by adding the yaw angle detected by the camera sensor 12 at the current time and the estimated yaw angle change amount is zero. Then, when the added value is zero, the driving support ECU 10 determines that the foreseeing end condition is established.

In the present embodiment, when the current time is a time t2a-3 in FIG. 11, the time period from the current time to the time t3a is the same as the predetermined time period for foreseeing. Therefore, when the driving support ECU 10 executes the processing of Step S67B at the time t2a-3, the driving support ECU 10 determines that the foreseeing end condition is established.

The yaw angle detected by the camera sensor 12 at the current time is substantially the same as the actual yaw angle at the time earlier than the current time by the yaw angle detection processing time period. Further, the predetermined time period for foreseeing is the same as the total time which is calculated by adding the yaw angle detection processing time period and the actuator delay time.

Therefore, when the value obtained by adding the yaw angle detected by the camera sensor 12 at the current time and the estimated yaw angle change amount is zero, the actual yaw angle at a time t2a-4 at which the actuator delay time passes from the current time (time t2a-3) can be estimated to be substantially the same as the yaw angle at the lane change start time t0.

Therefore, when the foreseeing end condition is established, the driving support ECU 10 issues an instruction to the EPS•ECU 20 to rotate the steering motor 22 by a predetermined amount.

When the driving support ECU 10 issues the instruction to the EPS•ECU 20 at the current time (the time t2a-3), the steering motor 22 rotates at the time t2a-4 at which the actuator delay time passes from the current time (the time t2a-3). Therefore, at time t2a-4 the actual yaw angle becomes substantially the same as the yaw angle at the lane change start time t0.

Upon completion of the processing of Step S67B, the driving support ECU 10 proceeds to Step S18 of the flowchart of FIG. 5. In other words, the driving support ECU 10 that has completed the first yaw angle return control before the time t3a proceeds to Step S18.

On the other hand, when determining No in Step S67B, the driving support ECU 10 proceeds to Step S67C.

In Step S67C, the driving support ECU 10 determines whether or not a first yaw angle return control end condition is established.

When the current time is the timing (the time t3a in FIG. 11) at which the first target curvature Cuemergency 1\* becomes substantially zero, the first yaw angle return control end condition is established. In the present embodiment, there is a difference between the time t2a-1 at which the formation of the first inverse integral value Intr1 is started and the time t1a at which an approaching vehicle is detected (that is, the time at which the first interruption condition is established). However, since this difference is extremely small, the yaw angle at the time t3a becomes substantially the same as the yaw angle at the lane change start time t0. In the present embodiment, the time period from the time t1a to the time t3a is referred to as a first control execution time TC1. When the current time has not reached the time t3a, the driving support ECU 10 returns the processing to Step S66 and executes similar processing. By repeating such processing at a predetermined calculation cycle, the yaw angle is reduced at a high speed.

Through repeating this processing, when the first yaw angle return control is completed (Step S67B: Yes or Step S67C: Yes), the driving support ECU 10 proceeds to Step S18 of the flowchart in FIG. 5.

The yaw angle is decreased to be substantially zero at the time when the processing of Step S67B or Step S67C has been finished. That is, lateral speed of the own vehicle is substantially zero. Therefore, the own vehicle can be controlled so as not to move to the center of the target lane in the lane width direction, and thus collision with the approaching vehicle is avoided. This function part of the driving support ECU 10, which executes the first yaw angle return control (Steps S64 through S67C), corresponds to collision avoidance support controller of the present invention.

In Step S18, the driving support ECU 10 determines whether or not the original lane return flag is "1".

In this case, the driving support ECU 10 determines Yes in Step S18 to proceed to Step S19.

In Step S19, the driving support ECU 10 determines whether or not a collision time TTCr is equal to or more than a predetermined threshold TTCthr.

The collision time TTCr is an estimated time period from the current time until the own vehicle collides with another vehicle on the original lane when the original lane return control is executed. The collision time TTCr is calculated by the driving support ECU 10 in the same manner as the above method to calculate the collision time TTC. For example, the threshold TTCthr is set to 4 seconds.

When determining "No" in Step S19, the drive support ECU 10 temporarily ends the processing of the flowchart of FIG. 5. That is, the driving support ECU 10 temporarily ends the steering assist control.

Figure 7:
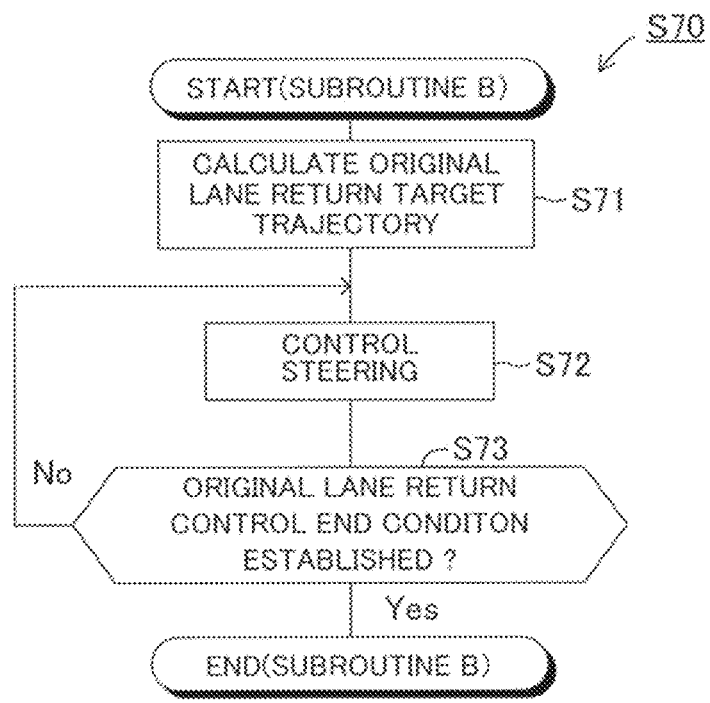
FIG. 7 is a flowchart for illustrating a subroutine B.

When determining Yes in Step S19, the driving support ECU 10 proceeds to Step S70. FIG. 7 is a flowchart showing the processing of Step S70 (subroutine B). The control indicated by the subroutine B is referred to as an original lane return control.

In Step S71, the diving support ECU 10 calculates a target trajectory for moving the own vehicle from the current position (the position of the own vehicle at the moment at which the first yaw angle return control is completed) to the center position of the original lane. Hereinafter, this target trajectory is referred to as original lane return target trajectory. As for this original lane return target trajectory, the function y(t) shown in the Expression (2) is also used. The function representing the original lane return target trajectory is called original lane return target trajectory function y(t). When the original lane return target trajectory function y(t) is calculated, in order to determine the coefficients c0, c1, c2, c3, c4, c5 of the function y(t) shown in the Expression (2), original lane return target trajectory calculation parameters are set as follows. The original lane return target trajectory calculation parameters are the following seven parameters (P21 to P27).

P21. Lateral position of the own vehicle at the current time (at the time when the first yaw angle return control is completed)

P22. Lateral speed of the own vehicle at the current time (at the time when the first yaw angle return control is completed)

P23. Lateral acceleration of the own vehicle at the current time (at the time when the first yaw angle return control is completed)

P24. Target lateral position which is the target value of the lateral position and to which the own vehicle is moved (In this example, the target lateral position is the center position of the original lane, and hereinafter is referred to as original lane return completion target lateral position.)

P25. Target lateral speed of the own vehicle when the own vehicle is moved to the original lane return completion target lateral position (The target lateral speed is referred to as original lane return completion target lateral speed.)

P26. Target lateral acceleration of the own vehicle when the own vehicle is moved to the original lane return completion target lateral position (The target lateral acceleration is referred to as original lane return completion target lateral acceleration.)

P27. Target time period which is target value of time period required for moving the own vehicle from the current position to the original lane return completion target lateral position (The target time period is referred to as original lane return completion target time period.)

Here, it is assumed that the lateral position of the own vehicle at the current time (when the first yaw angle return control is completed) is yreturn, the lateral speed is vyreturn, the lateral acceleration is ayreturn, the time t at which the first yaw angle return control is completed is newly set to zero (t=0), and the original lane return completion target time period is treturn. The original lane return target trajectory calculation parameters are set as follows: y(0)=yreturn, y'(0)=vyreturn, y"(0)=ayreturn, y(treturn)=W (the sign is set according to the lane change direction), Y'(treturn)=0, y"(treturn)=0.

The lateral position yreturn, the lateral speed vyreturn, and the lateral acceleration ayreturn are detected values at the current time, and can be calculated in the same way as the above-described method for calculating the initial lateral state amount. That is, the lateral position yreturn is the lateral deviation Dy at the current time. The lateral speed vyreturn can be obtained from the vehicle speed v at the current time and the yaw angle θy at the current time (vyreturn=v·sin (θy)). The lateral acceleration ayreturn is the value (v·γ) obtained by multiplying the yaw rate y at the current time by the vehicle speed v at the current time. The y(treturn) is the original lane return completion target lateral position, and is set to the center position of the original lane. In this case, when the camera sensor 12 is outputting the lane information of the original lane at the time when the first yaw angle return control is completed, y(treturn)=0. The y'(treturn) represents the original lane return completion target lateral speed, and the y"(treturn) represents the original lane return completion target lateral acceleration. Both the y'(treturn) and the y"(treturn) are set to zero.

In addition, the original lane return completion target time period treturn is calculated using a target time setting constant Areturn, which is approximately the same value as the target time setting constant A used when the target lane change time tlen is calculated at the start of the LCA, by the following Expression (22).

$$treturn = Dreturn \cdot Areturn \quad (22)$$

Here, Dreturn is a necessary distance for moving the own vehicle in the lateral direction from the lateral position of the own vehicle at the time when the first yaw angle return control is completed to the original lane return completion target lateral position (the center position of the original lane). At the time when the first yaw angle return control is completed, a collision of the own vehicle with another vehicle is avoided. Therefore, the speed at which the position of the own vehicle is moved in the lateral direction can be approximately the same as the LCA, and thus the target time setting constant Areturn is set to a value approximately the same as the target time setting constant A when the LCA is executed.

Based on the set values of the original lane return target trajectory computing parameter, the driving support ECU 10 calculates the values of the coefficients c0, c1, c2, c3, c4, c5 of the function y(t) shown by the Expression (2) in the same way as Step S13. Then, by substituting the values of the calculated coefficients c0, c1, c2, c3, c4, c5 into the Expression (2), the original lane return target trajectory function y(t) is calculated.

Upon calculating the original lane return target trajectory function in Step S71, the driving support ECU 10 advances the processing to Step S72. In Step S72, the driving support ECU 10 performs steering control based on the original lane return target trajectory function calculated in Step S71. In this case, the driving support ECU 10 resets the dock timer t (the dock timer t starts after being cleared to zero), and calculates the target lateral movement state quantity (y*, vy*, ay*) and the target yaw state quantity (θy*, γ*, Cu*) based on the elapsed time t from the time when the first yaw angle return control is completed and the original lane return target trajectory function y(t) in the same manner as Step S14 to calculate the final target steering angel θreturn*. The target steering angle θreturn* can be calculated, for example, by replacing the left-hand side of Expression (15) with the target steering angle θreturn*.

Upon calculating the target control amount (target steering angle θreturn*), the driving support ECU 10 transmits a steering command representing the target control amount to the EPS•ECU 20. In the present embodiment, the driving support ECU 10 calculates the target steering angle ereturn* as the target control amount. However, the driving support ECU 10 may calculate a target torque for obtaining the target steering angle θreturn*, and may transmit the steering command representing the target torque to the EPS•ECU 20.

Subsequently, in Step S73, the driving support ECU 10 determines whether or not an original lane return control end condition is established. In this case, when detecting that the lateral position of the own vehicle has reached the original lane return completion target lateral position (the center position of the original lane) by the steering control in Step S72, the driving support ECU 10 determines that the original lane return control end condition is established.

When determining that the original lane return control end condition is not established (Step S73: No), the driving support ECU 10 returns the processing to Step S72. Therefore, the steering control in Step S72 continues to be executed until the original lane return control end condition is established. As a result, the own vehicle travels toward the center position of the original lane.

Through repeating this processing, when the original lane return control end condition is established, the driving support ECU 10 ends the processing of the subroutine B of FIG. 7, and proceeds to Step S17 of the main routine (the steering assist control routine). As a result, the steering assist control state is switched to the LTA ON state. The function part of the driving support ECU 10 which executes the processing from Step S71 to Step S73 corresponds to the original lane return assist controller of the present invention.

The broken line in FIG. 13 represents the target lane return target trajectory when the own vehicle C1 and another vehicle C3 approach each other.

On the other hand, when the driving support ECU 10 determines No in Step S63 of the subroutine A in FIG. 6, the driving support ECU 10 proceeds to Step S68. That is, when the second interruption condition is established, the driving support ECU 10 proceeds to Step S68. In Step S68, the driving support ECU 10 sets the steering assist control state to a second yaw angle return control state and terminates the LCA.

Further, in Step S68, the driving support ECU 10 calculates a second yaw angle return target trajectory (see FIG. 13) for returning the yaw angle of the own vehicle to the state (the yaw angle) immediately before the start of the LCA.

The calculation method of the second yaw angle return target trajectory is similar to the calculation method of the first yaw angle return target trajectory.

Figure 14:
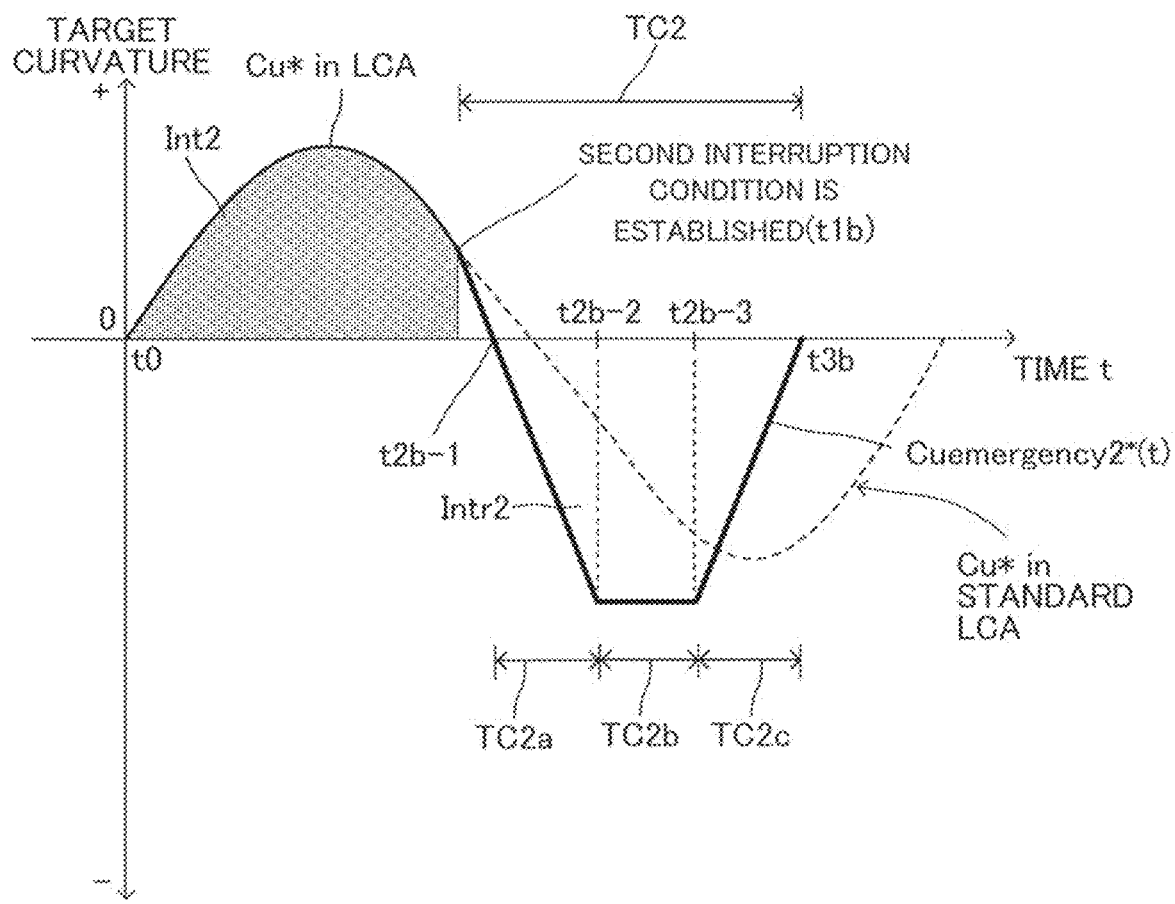
FIG. 14 is a graph for illustrating a target curvature when a second yaw angle return control is executed.

For example, it is assumed that the second interruption condition is established at a time t1b when a time t0 in FIG. 14 is the lane change start time of the LCA. The second yaw angle return target trajectory is defined by the target curvature versus (corresponding to) the elapsed time from the time when the second interruption condition is established.

Also in this case, similarly to the first yaw angle return control, the integral value of the target curvature Cu* from the lane change start time t0 to the time t1b corresponds to the surface area of the portion colored in gray in FIG. 14. Therefore, when the sign of the feed-forward control amount corresponding to that surface area is reversed (the left-right direction is reversed) and the feed-forward control amount is issued as a command to the EPS•ECU 20, the yaw angle can be returned to the state at the lane change start time t0 at the point when output of the feed-forward control amount is complete. The value obtained by reversing the sign (plus or minus) of a second integral value Int2, which is the integral value of the target curvature Cu* from the lane change start time t0 to the time t1b, is referred to as a second inverse integral value Intr2. This second inverse integral value Intr2 corresponds to the surface area of a trapezoidal portion formed under the abscissa axis (time axis) between a time t2b-1 and a time t3b which is the finish time of the control based on the second yaw angle return target trajectory in FIG. 14. The value obtained by adding this second inverse integral value Intr2 to the second integral value Int2 of the target curvature Cu* from the lane change start time t0 to the time t1b is zero.

When the second yaw angle return target trajectory is calculated, a second control execution time TC2 which is the time period between the time t1b and the time t3b is set to be longer than the first control execution time TC1. Further, the time period from a time t2b-1 to a time t2b-2 which is the time corresponding to the start point of the horizontal lower end portion of the trapezoidal shape (the second inverse integral value Intr2) is set to TC2a (for example, 0.5 seconds). The time period from the time t2b-2 to the time t2b-3 which is the time corresponding to the end point of the lower end portion of the trapezoidal shape is set to TC2b (for example, 3.0 seconds). Further, the time period from time t2b-3 to the time t3b is set to TC2c (for example, 0.5 seconds).

The driving support ECU 10 calculates a second target curvature Cuemergency 2* which is a target curvature versus (corresponding to) the elapsed time t from the time t1b by using the value of the second inverse integral value Intr2, the TC2a, the TC2b, and the TC2c. In other words, the driving support ECU 10 calculates the maximum value (lower end position of the trapezoidal shape) of the second target curvature Cuemergency 2* based on the sum total of the TC2a, the TC2b, and the TC2c which are the upper base of the second inverse integral value Intr2 (the trapezoidal shape) and the TC2b which is the lower base of the second inverse integral value Intr2 (the trapezoidal shape) to determine the outer shape of the second integral value Int2. Further, the driving support ECU 10 calculates the second target curvature Cuemergency 2* between the time t1b and the time t2b-1 by extending the inclined straight line which is the outer shape of the second integral value Int2 between a time t2b-1 and the time t2b-2.

The maximum value of the second target curvature Cuemergency 2* which corresponds to the lower end portion of the trapezoidal shape calculated in this manner is smaller than the maximum value (Cumax) of the first target curvature Cuemergency 1*. Both the inclination of the second target curvature Cuemergency 2* between the time t2b-1 and the time t2b-2 and the inclination of the second target curvature Cuemergency 2* between the time t2b-3 and the time t3b are smaller than the maximum change in gradient (Cu'max) of the first target curvature Cuemergency 1*.

Hereinafter, the second target curvature Cuemergency 2* versus (corresponding to) the elapsed time t may be referred to as a second target curvature function Cuemergency 2*(t). The second target curvature function Cuemergency 2*(t) determines the target trajectory of the own vehicle. Therefore, the second target curvature function Cuemergency 2*(t) corresponds to the second yaw angle return target trajectory.

The above is a description of the calculation of the second yaw angle return target trajectory (the second target curvature Cuemergency 2*).

In Step S68 of FIG. 6, the diving support ECU 10 sends an alarm to the driver to inform him/her that the LCA is halfway ended and that the camera sensor 12 cannot (fails to) recognize the relative position of the own vehicle with respect to the lane in the lane width direction at the same time as the calculation of the second yaw angle return target trajectory.

Figure 15:
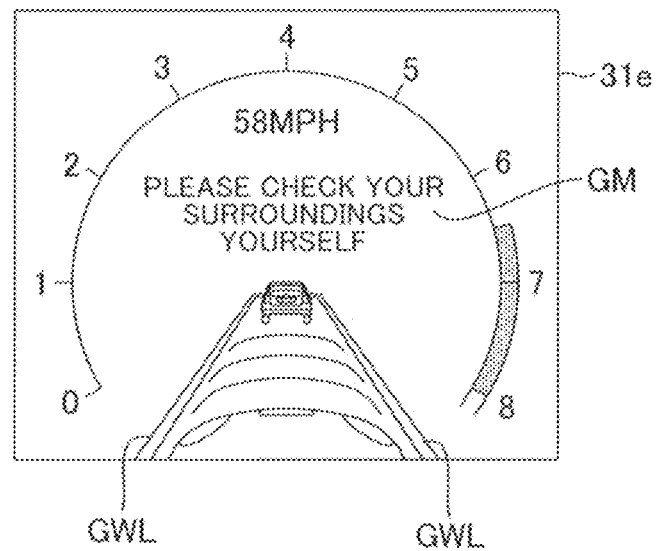
FIG. 15 is a diagram for illustrating the screen of the display unit when the second yaw angle return control is executed.

Upon receiving a command from the diving support ECU 10 in Step S68, the meter ECU 30 displays a relative position unrecognized warning screen 31e on the display unit 31 as shown in FIG. 15. On the relative position unrecognized warning screen 31e, the trajectory Z, which had been displayed on the display unit 31 until just before, is not displayed.

Upon completion of the processing of Step S68, the diving support ECU 10 proceeds to Step S69 to set the original lane return flag to "0".

Next, in Step S66, the driving support ECU 10 performs steering control based on the second target curvature Cuemergency 2* calculated in the previous Step S68. This steering control based on the second target curvature Cuemergency 2* is substantially the same as the steering control based on the first target curvature function Cuemergency 1*(t). That is, the driving support ECU 10 resets the clock timer t (the clock timer t starts after being cleared to zero), and calculates the second target curvature Cuemergency 2* at the current time point based on the elapsed time t from the time t1b at which the camera sensor 12 failed to recognize the relative position of the own vehicle and the second target curvature function Cuemergency 2*(t). The driving support ECU 10 calculates a target steering angel eemergency* at the current time point based on the second target curvature Cuemergency 2* and the curvature Cu which is the latest one among the curvatures Cu detected by the camera sensor 12 before the time t1b. This target steering angel eemergency* is referred to as second target control amount.

Further, the driving support ECU 10 transmits a steering command representing the target steering angel eemergency* to the EPS•ECU 20 each time the target steering angel eemergency* is calculated. When the EPS•ECU 20 receives the steering command, the EPS•ECU 20 controls the drive of the steering motor 22 so that the steering angle follows the target steering angel eemergency*.

In the following description, steering control using the target steering angel eemergency* based on the second target curvature Cuemergency 2* is referred to as second yaw angle return control. Also in the second yaw angle return control, the steering angle is controlled based only on feed-forward control term using the value obtained by adding the second target curvature Cuemergency 2* and the curvature Cu detected by the camera sensor 12.

Next, in Step S67A, the driving support ECU 10 determines whether or not the original lane return flag is "1".

In this case, the original lane return flag is "0", and thus the driving support ECU 10 proceeds to Step S67D.

Next, in Step S67D, the driving support ECU 10 determines whether or not a second yaw angle return control end condition is established. When the current time is the timing (the time t3b in FIG. 14) at which the second target curvature Cuemergency 2* becomes zero, the second yaw angle return control end condition is established. There is a difference between the time t2b-1 at which the formation of the second inverse integral value Intr2 is started and the time t1b at which the camera sensor 12 became unable to recognize the relative position of the own vehicle in the lane width direction (that is, the time at which the second interruption condition is established). However, since this difference is extremely small, the yaw angle at the completion time of the second yaw angle return control becomes substantially the same as the yaw angle at the lane change start time to.

When the second yaw angle return control is completed (Step S67D: Yes), the driving support ECU 10 proceeds to Step S18 of the flowchart of FIG. 5, and determines No in Step S18.

Then, the driving support ECU 10 temporarily ends the processing of the flowchart of FIG. 5. That is, the driving support ECU 10 temporarily ends the steering assist control.

In this case, for example, the steering assist control is temporarily ended while the own vehicle is positioned on the target lane. In other words, there is a fear of the driver feeling that the steering assist control has been suddenly ended. Therefore, there is a fear that the driver can not properly steer the steering wheel immediately upon completion of the steering assist control.

However, at the time t3b which is the finish time of the second yaw angle return control, the yaw angle is reduced to almost zero. Therefore, since the own vehicle does not move to the center of the target lane in the width direction, there is no possibility that the own vehicle collides with an approaching vehicle.

According to the steeling assist device of the present embodiment described above, the first yaw angle return control is executed when the first interruption condition is established during the LCA, and the second yaw angle return control is executed when the second interruption condition is established during the LCA. Then, the own vehicle is prevented from moving to the center of the target lane in the width direction by executing the first yaw angle return control or the second yaw angle return control.

Incidentally, the first interruption condition is established when the collision time TTC from the current time until the own vehicle collides with another vehicle is less than the threshold TTCth under the state where the LCA is executed. That is, the first yaw angle return control is executed when the own vehicle is likely to collide with another vehicle under the state where the own vehicle continues the execution of the LCA until the LCA completion condition is established.

Therefore, when the first yaw angle return control is executed, it is necessary to quickly return the yaw angle of the own vehicle to the same value or substantially the same value as the yaw angle at the lane change start time to.

Therefore, the first control execution time TC1 of the first yaw angle return control is set to be shorter than the second control execution time TC2 of the second yaw angle return control.

On the other hand, the second interruption condition is established when the camera sensor 12 becomes unable to (fails to) recognize the relative position of the own vehicle in the lane width direction. In other words, in the case where the second interruption condition is established, the own vehicle is unlikely to collide with another vehicle under the state where the own vehicle continues the execution of the LCA until the LCA completion condition is established.

Therefore, in this case, there is no need to quickly return the yaw angle of the own vehicle to the same value or substantially the same value as the yaw angle at the lane change start time to.

Therefore, the second control execution time TC2 of the second yaw angle return control is set to be longer than the first control execution time TC1 of the first yaw angle return control.

Therefore, the change rate per unit time of the yaw angle of the own vehicle during the second yaw angle return control is smaller than the change rate per unit time of the yaw angle of the own vehicle during the first yaw angle return control. Therefore, an occupant of the own vehicle hardly feels uncomfortable during the second yaw angle return control.

As described above, according to the present embodiment, it is possible to return the yaw angle of the own vehicle to the same value or substantially the same value as the yaw angle at the lane change start time t0 in an appropriate manner depending on the interruption factor of the LCA.

Incidentally, the camera sensor 12 of the own vehicle acquires the yaw angle. That is, the camera sensor 12 can acquire the yaw angle at the lane change start time and the yaw angle at the time t1a which is the start time of the first yaw angle return control.

Therefore, it is theoretically possible to bring (operate) the steering motor 22 under feedforward control or feedback control so as to make a value of the yaw angle at the finish time of the first yaw angle return control be the same or substantially the same as the yaw angle at the lane change start time t0 when, for example, the yaw angle acquired by the camera sensor 12 at time t1a is greater than zero.

However, the camera sensor 12 acquires the yaw angle by photographing the white line(s) WL, performing image processing on the acquired imaging data, and calculating based on the image processed data. That is, the yaw angle detection processing time period which is too long to be ignored elapses from when the camera sensor 12 captures the white line(s) WL until when the camera sensor 12 calculates the yaw angle. In other words, an error having a magnitude which is too large to be ignored occurs between the yaw angle acquired by the camera sensor 12 at the time t1a and the actual yaw angle at the time t1a. Therefore, when the first yaw angle return control is executed in this way, there is a high possibility that the yaw angle at the first finish time of the first yaw angle return control does not become the same value or substantially the same value as the yaw angle at the lane change start time to.

Thus, in the first yaw angle return control of the present embodiment, the yaw angle is returned to the same value or substantially the same value as the yaw angle at the lane change start time t0 by the feedforward control which is based on the integral value (the first integral value Int1) of the target curvature Cu* from the lane change start time t0 to the time (t1a) at which the first interruption condition is established.

This integral value does not include the above error caused by the camera sensor 12. Therefore, the first yaw angle return control can be accurately executed so that the yaw angle at the time t3a, which is the finish time of the first yaw angle return control, is the same value or substantially the same value as the yaw angle at the lane change start time t0.

Further, similarly to the first yaw angle return control, the second yaw angle return control is also executed with high accuracy so that the yaw angle at the time t3b, which is the finish time, is the same value or substantially the same value as the yaw angle at the lane change start time t0.

It should be noted that the feed forward control amount in the first yaw angle return control and the second yaw angle return control includes the component (Klca1·Cu) of the curvature Cu representing the curve shape of the road. However, since this component is control amount for causing the own vehicle to travel along the road shape and the degree of the change of this component is extremely gentle, this component does not adversely affect on the yaw angle return control.

Furthermore, when the first yaw angle return control, which is a feedforward control, is executed until the time t3a, the yaw angle at time t3a can be estimated to be the same as the yaw angle at the lane change start time t0. However, for example, due to the road surface condition of the road on which the own vehicle is traveling, an error may occur between the actual yaw angle at the time t3a and the yaw angle at the lane change start time t0.

The magnitude of the actual yaw angle can be detected by the camera sensor 12. Therefore, the camera sensor 12 can detect the yaw angle of the own vehicle at the time t3a.

Incidentally, as described above, the camera sensor 12 requires the yaw angle detection processing time period from when capturing a white line until when detecting (acquiring) the yaw angle. Therefore, for example, when the camera sensor 12 detects that the yaw angle at a predetermined detection time (for example, at the time t2a-3) is a predetermined angle α, the actual yaw angle was highly likely to be the predetermined angle α at a predetermined time before detection time, which comes before the detection time by the yaw angle detection processing time period. In other words, a certain amount of error is highly likely to be occurred between the actual yaw angle at the detection time and the predetermined angle α. In particular, the moving speed of the own vehicle in the lane width direction under the first yaw angle return control is higher than the moving speed of the own vehicle in the lane width direction under the second yaw angle return control. That is, the change amount of the yaw angle per unit time during the first yaw angle return control is larger than the change amount of the yaw angle per unit time during the second yaw angle return control. Therefore, in the first yaw angle return control, the amount of error between the yaw angle detected by the camera sensor 12 at the detection time and the actual yaw angle at the detection time tends to become large.

Therefore, in the first yaw angle return control, it is not possible to accurately determine whether or not the yaw angle of the own vehicle at the time t3a is the same as the yaw angle at the lane change start time t0 using the camera sensor 12.

Therefore, in the present embodiment, the driving support ECU 10 determines whether or not the foreseeing end condition is established in Step S67B, and ends the first yaw angle return control when the foreseeing end condition is established. In other words, the driving support ECU 10 ends the first yaw angle return control at the time t2a-3 before the time t3a.

When the foreseeing end condition is established, the yaw angle of the own vehicle at the time t2a-4, which comes before the time t3a, can be estimated to become the same as the yaw angle at the lane change start time t0. In other words, it is possible to accurately determine whether or not the yaw angle of the vehicle at the time t2a-4 becomes the same as the yaw angle at the lane change start time t0 using the camera sensor 12.

Figure 16:
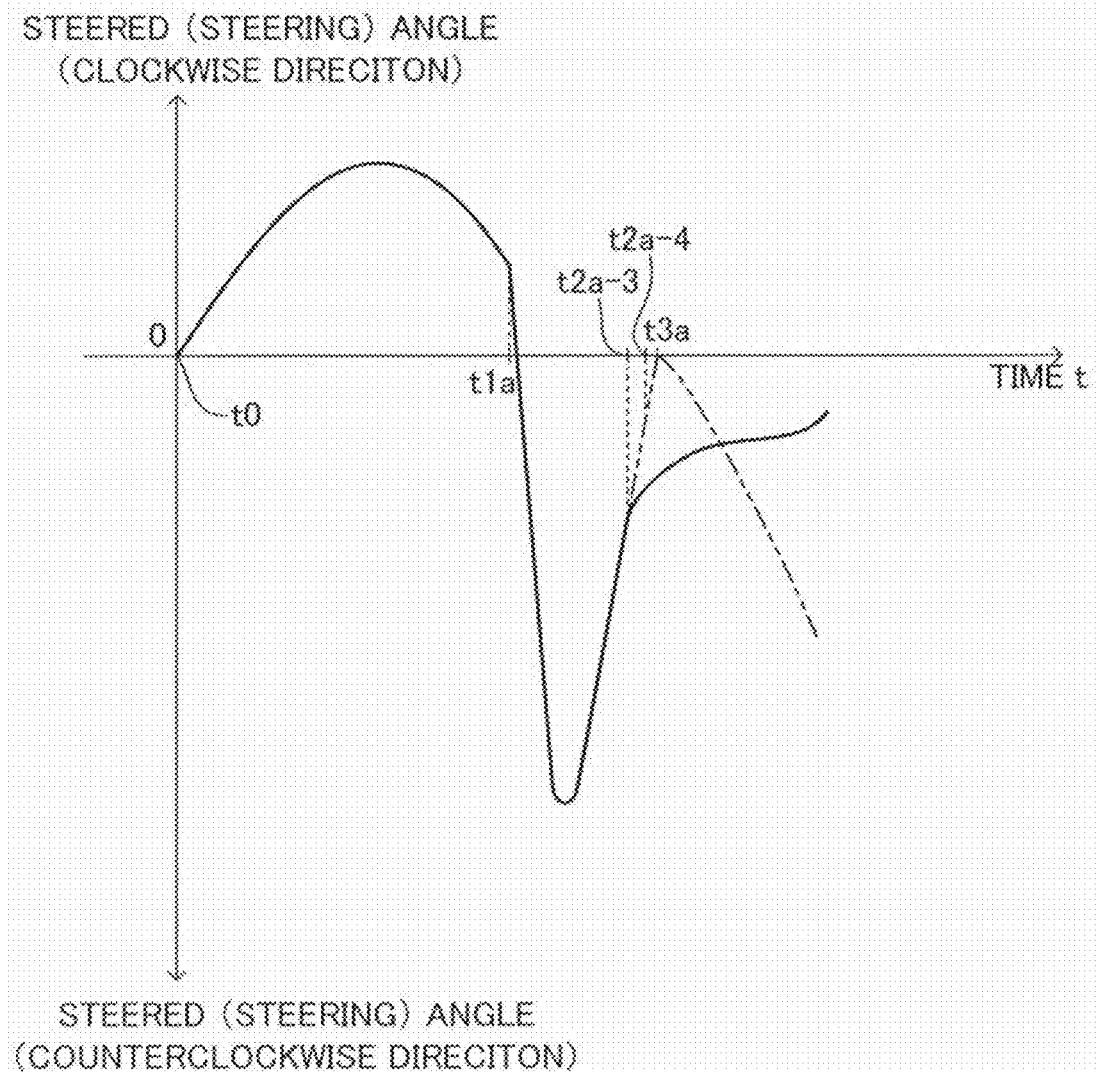
FIG. 16 is a graph for illustrating a change in a steering angle of a steering wheel when the first yaw angle return control is executed.

Further, when the first yaw angle return control for causing the own vehicle C1 to travel along the first yaw angle return trajectory shown in FIG. 13 is started at the time t1a, the steeling angle of the steeling wheel (the steered angle of the steered wheel) changes as shown in FIG. 16. In the example shown in FIG. 16, the steeling direction of the steering wheel is clockwise direction viewed from the diver from the lane change start time t0 to the time immediately after the time t1a.

When the driving support ECU 10 determines Yes in Step S67C, the first yaw angle return control is executed until the time t3a. In this case, immediately after the time t1a, the steering angle of the steering wheel temporarily becomes zero. Further, after that, the steering direction of the steering wheel is switched from the clockwise direction to the counterclockwise direction, and the steering angle gradually increases. Then, the steering angle of the steering wheel gradually decreases from the time which comes before and is near the time t3a to the time t3a. Then, as shown by the imaginary line in FIG. 16, the steering angle of the steering wheel becomes zero at the time t3a. When the original lane return control is started at the time t3a, the steering wheel is again steered in the counterclockwise direction and the steering angle of the steering wheel again increases from zero.

However, when the steering angle of the steering wheel changes in such a manner, the occupant of the own vehicle is easy to feel uncomfortable.

On the other hand, when the foreseeing end condition is established at the time t2a-3, as described above, the first yaw angle return control is terminated at the time t2a-3. In this case, as shown in FIG. 16, the steering angle of the steering wheel at the time t2a-4 is larger than zero.

When the steering angle of the steering wheel changes in this manner, the occupant of the own vehicle is hard to feel uncomfortable.

In the above, the steering assist device according to the present embodiment has been described, but the present invention is not limited to the above-mentioned embodiment, and various changes are possible within the range not departing from the object of the present invention.

For example, the predetermined time period for foreseeing may be set to the same time as the yaw angle detection processing time period. In other words, the predetermined time period for foreseeing may be set to a value (time period) which does not include the actuator delay time.

In the original lane return control of the above embodiment, the final target lateral position is set to the center position of the original lane. However, it is not always necessary to set the final target lateral position to the center position. That is, for example, the final target lateral position may be set to a predetermined lateral position within the original lane.

For example, in the embodiment, the LCA is executed on the presumption that the steering assist control state is the LTA-ON state (state in which the LTA is executed), but such presumption is not necessarily required. The presumption that ACC is being executed is also not required. In this embodiment, the LCA is executed on the condition that the road along which the own vehicle travels is a road for exclusive use by automobiles, but it is not always required for that condition to be included.

In the above embodiment, the lane is recognized by the camera sensor 12. However, for example, the navigation ECU 70 may detect the relative position of the own vehicle with respect to the lane.

What is claimed is:

1. An electronic control unit (ECU) of a vehicle, the ECU configured to:
   execute lane change assist control (LCA) to initiate a lane change from an initial lane to a target lane;
   control an actuator to adjust a steeling angle in a first direction, based on executing the LCA;
   determine that a time to collision (TTC) between the vehicle and another vehicle in the target lane is less than a threshold, based on executing the LCA;
   control the actuator to adjust the steeling angle in a second direction, based on determining that the TTC is less than the threshold;
   determine a yaw angle change amount based on a yaw rate detected by a yaw rate sensor of the vehicle and a predetermined time frame, based on controlling the actuator to adjust the steering angle in the second direction;

determine a value based on the yaw angle change amount and a yaw angle detected by a camera of the vehicle;

compare the value and an initial yaw angle of the vehicle; and control the actuator based on comparing the value and the initial yaw angle of the vehicle.

2. The ECU of claim 1, wherein the ECU is configured to determine the value by multiplying the predetermined time frame and the yaw rate.

3. The ECU of claim 2, wherein the predetermined time frame corresponds to a yaw angle detection processing time frame of the camera and an actuator delay time of the actuator.

4. The ECU of claim 1, wherein the ECU is configured to:
determine whether the value is zero; and
control the actuator based on determining that the value is zero.

5. A method performed by an electronic control unit (ECU) of a vehicle, the method comprising:

executing lane change assist control (LCA) to initiate a lane change from an initial lane to a target lane;

controlling an actuator to adjust a steering angle in a first direction, based on executing the LCA;

determining that a time to collision (TTC) between the vehicle and another vehicle in the target lane is less than a threshold, based on executing the LCA;

controlling the actuator to adjust the steering angle in a second direction, based on determining that the TTC is less than the threshold;

determining a yaw angle change amount based on a yaw rate detected by a yaw rate sensor of the vehicle and a predetermined time frame, based on controlling the actuator to adjust the steering angle in the second direction;

determining a value based on the yaw angle change amount and a yaw angle detected by a camera of the vehicle;

comparing the value and an initial yaw angle of the vehicle; and controlling the actuator based on comparing the value and the initial yaw angle of the vehicle.

\* \* \* \* \*